(12) United States Patent  
Misawa

(10) Patent No.: US 8,482,661 B2
(45) Date of Patent: Jul. 9, 2013

(54) POWER TRANSMISSION MECHANISM HAVING CAM-INCORPORATED GEAR, AND POWER TRANSMISSION MECHANISM OF IMAGING APPARATUS

(75) Inventor: Masayuki Misawa, Tokyo (JP)

(73) Assignee: Pentax Ricoh Imaging Company, Ltd., Tokyo (JP)

(*) Notice: Subject to any disclaimer, the term of this patent is extended or adjusted under 35 U.S.C. 154(b) by 314 days.

(21) Appl. No.: 12/814,693

(22) Filed: Jun. 14, 2010

(65) Prior Publication Data

US 2010/0321556 A1 Dec. 23, 2010

(30) Foreign Application Priority Data

Jun. 17, 2009 (JP) ................................ 2009-144103

(51) Int. Cl.
*H04N 5/238* (2006.01)

(52) U.S. Cl.
USPC ........................................................... 348/367

(58) Field of Classification Search
USPC ........... 348/362, 367, 368; 396/358; 359/872, 359/877
See application file for complete search history.

(56) References Cited

U.S. PATENT DOCUMENTS

| 4,547,052 | A | * | 10/1985 | Morisawa | 348/207.99 |
| 4,589,023 | A | * | 5/1986 | Suzuki et al. | 348/341 |
| 4,849,819 | A | * | 7/1989 | Ishiguro et al. | 348/220.1 |
| 5,878,296 | A | | 3/1999 | Ogi et al. | |
| 6,183,142 | B1 | * | 2/2001 | Sakamoto et al. | 396/358 |
| 7,302,173 | B2 | * | 11/2007 | Nakagawa | 396/111 |
| 7,435,017 | B2 | * | 10/2008 | Tsukatani | 396/358 |
| 7,471,891 | B2 | * | 12/2008 | Kurosawa | 396/296 |
| 7,628,550 | B2 | * | 12/2009 | Okumura | 396/358 |
| 7,637,675 | B2 | * | 12/2009 | Sakai et al. | 396/505 |
| 7,909,519 | B2 | * | 3/2011 | Iwase | 396/358 |
| 2007/0019945 | A1 | * | 1/2007 | Kurosawa | 396/296 |
| 2007/0253700 | A1 | * | 11/2007 | Okumura | 396/358 |

FOREIGN PATENT DOCUMENTS

JP 3153482 1/2001

OTHER PUBLICATIONS

English language Abstract of corresponding JP 10-148865 of JP 3153482.
"Asahi Camera", Asahi Shimbun Publication Inc., Jan. 2008; pp. 230 and 231, together with an English-language translation.
"Asahi Camera", Asahi Shimbun Publication Inc., Aug. 2008; pp. 202 and 203, together with an English-language translation.
U.S. Appl. No. 12/777,455 to Misawa, which was filed on May 11, 2010.
U.S. Appl. No. 12/777,434 to Misawa, which was filed on May 11, 2010.
U.S. Appl. No. 12/814,738 to Misawa, which was filed on Jun. 14, 2010.

* cited by examiner

*Primary Examiner* — Nicholas Giles
(74) *Attorney, Agent, or Firm* — Greenblum & Bernstein, P.L.C.

(57) ABSTRACT

A power transmission mechanism includes a rotational drive member which rotates to drive a driven member, a drive switcher for switching between a transmission-ON state in which a driving force of a drive source is transmitted to the rotational drive member to rotate the rotational drive member and a transmission-OFF state in which the transmission of the driving force to the rotational drive member is canceled, and a rotation restrictor which allows the rotational drive member to rotate when the drive switcher is in the transmission-ON state and is engaged with the rotational drive member to restrict rotation of the rotational drive member when the drive switcher is in the transmission-OFF state.

11 Claims, 20 Drawing Sheets

POWER TRANSMISSION MECHANISM HAVING CAM-INCORPORATED GEAR, AND POWER TRANSMISSION MECHANISM OF IMAGING APPARATUS

BACKGROUND OF THE INVENTION

1. Field of the Invention

The present invention relates to a power transmission mechanism having at least one cam-incorporated gear, and in particular, relates to a type of power transmission mechanism having at least one cam-incorporated gear and a planetary gear mechanism used to transmit rotation to the cam-incorporated gear. The present invention also relates to a power transmission mechanism of an imaging apparatus.

2. Description of the Related Art

In addition to a conventional object viewing function (optical view mode) using an optical viewfinder, SLR digital cameras having a ' live view mode', in which an electronic object image captured by an image sensor is viewed in real-time on a display monitor such as an LCD before photographing, are known in the art. In the live view mode, the quick-return mirror (hereinafter referred simply to as the mirror) is held in the retracted position (mirror-up position) in which the quick-return mirror is retracted from a photographing optical path when the object is viewed before photographing, which is different from a viewing state in the optical view mode, in which the object is viewed through an optical viewfinder before photographing. Therefore, when a photographing operation is performed in the live view mode, the mirror drive operation and the shutter drive operation need to be controlled in a different manner from those in optical view mode (normal exposure mode).

In the SLR digital camera disclosed in Non-Patent Document 1 (pages 202 and 203 in "Asahi Camera" (a Japanese monthly photographic magazine published by Asahi Shimbun Publications Inc., print edition, August 2008), another image sensor (live-view image sensor) used exclusively for capturing the object image in the live view mode, independently of an image sensor used for taking pictures, is installed in a viewfinder optical system so that a quasi-live view operation can be performed using the live-view image sensor in the viewfinder optical system. In this type of camera, an electronic image captured by an image sensor different from the image sensor used at a time of exposure is viewed on a display monitor before shooting, and accordingly, this view mode cannot be considered to be live view mode in the strict sense, as there is a possibility of the image displayed on the monitor not precisely coinciding with the image taken at a time of exposure. Additionally, installation space for an image sensor needs to be secured in the viewfinder, which becomes an obstacle for miniaturization of the camera and causes an increase in production cost.

In the SLR digital camera disclosed in Non-Patent Document 2 (pages 230 and 231 in "Asahi Camera" (a Japanese monthly photographic magazine published by Asahi Shimbun Publications Inc., print edition, January 2008), the mirror drive mechanism and the shutter drive mechanism are provided with two independent drive sources, respectively, and a shutter charge operation is performed by the shutter drive mechanism with a mirror-up state being maintained by the mirror drive mechanism in a photographing operation in the live view mode. In this type of camera, a mirror drive system and a shutter drive system are each provided with an independent drive source and an independent drive mechanism, which makes it difficult to achieve miniaturization and weight reduction of the camera and causes an increase in production cost.

The applicant of the present invention has found that miniaturization, weight reduction and cost reduction of the camera body can be achieved in an SLR camera having a live view mode by solving the above described problems that reside in Non-Patent Documents 1 and 2 by employing a planetary gear mechanism as a mechanism for transmitting driving force of a motor to a mirror drive system (mechanism) and a shutter charge system (mechanism). Specifically, the intention is to carry out a photographing operation (sequence of processes for taking a picture) in the live view mode by a drive mechanism equipped with two cam-incorporated gears like the drive mechanism shown in Japanese Patent No. 3,153,482 and to transmit a driving force selectively to the two cam-incorporated gears via a planetary gear mechanism.

In the case where a power transmission mechanism of a mirror drive system or a shutter charge system in an SLR camera includes a cam-incorporated gear as a component of the power transmission mechanism, the rotational position of the cam-incorporated gear must be precisely controlled to carry out a photographing operation. For instance, in a type of power transmission mechanism as shown in Non-Patent Document 2 in which the mirror drive mechanism and the shutter drive mechanism are provided with two independent drive sources, respectively, the cam-incorporated gear can be held at a fixed rotational position by the load of a drive source in a state where the rotational driving of the cam-incorporated gear by the drive source is at rest. On the other hand, in another type of power transmission mechanism in which the driving state of the cam-incorporated gear is selected by a drive switcher such as the above described planetary gear mechanism, there is a possibility of the rotational position of the cam-incorporated gear being displaced in a state where the cam-incorporated gear is disengaged from a planet gear. If such a displacement of the rotational position occurs, a mechanical part of the camera comes to a state different from the original state, which may exert an adverse influence on the drive control of the camera. A power transmission mechanism using a cam-incorporated gear in an SLR camera has been discussed above by way of example; however, in a typical power transmission mechanism having a rotational drive member, the operation of which needs to be controlled at high precision, a similar problem arises when power other than the power of a drive source acts on the rotational drive member.

SUMMARY OF THE INVENTION

The present invention has been devised in view of the above described problems and provides a power transmission mechanism capable of controlling the rotational position of a rotational drive member, that is selectively switched between a state where a rotational driving force is transmitted from a drive source to the rotational drive member and a state where the transmission of the rotational driving force to the rotational drive member is canceled, even when the rotational drive member is in the transmission canceled state.

According to an aspect of the present invention, a power transmission mechanism is provided, including a rotational drive member which rotates to drive a driven member; a drive switcher for switching between a transmission-ON state in which a driving force of a drive source is transmitted to the rotational drive member to rotate the rotational drive member, and a transmission-OFF state in which the transmission of the driving force to the rotational drive member is canceled; and a rotation restrictor which allows the rotational drive member to rotate when the drive switcher is in the transmission-ON state, and is engaged with the rotational drive member to restrict rotation of the rotational drive member when the drive switcher is in the transmission-OFF state.

Desirably, the rotation restrictor switches between a state to allow the rotational drive member to rotate and a state to restrict the rotation of the rotational drive member via use of a switching force of the drive switcher which is produced when the drive switcher moves between the transmission-ON state and the transmission-OFF state. With this structure, the rotation restrictor can be made to operate without using its own drive source, which makes it possible to simplify the structure.

It is desirable for the rotational drive member to include a gear, and for the drive switcher to include a planet gear swingable between an engaged position to be engaged with the gear of the rotational drive member and a disengaged position to be disengaged from the gear of the rotational drive member, and a swingable arm which supports the planet gear. The rotation restrictor includes a lock lever that is swingable between a rotation restrictive position, in which the lock lever is engaged with the rotational drive member, and a rotation permitting position, in which the lock lever is disengaged from the rotational drive member. The lock lever is held in the rotation restrictive position by a biaser when the planet gear is in the disengaged position and held in the rotation permitting position by the swingable arm against a biasing force of the biaser when the planet gear is in the engaged position.

It is desirable for the rotational drive member to include a cam-incorporated gear having a surface cam, the gear being formed on a periphery of the cam-incorporated gear. The driven member includes a swingable member having a follower contactable with the surface cam, a rotation of the cam-incorporated gear causing the swingable member to rotate in accordance with a cam profile of the surface cam. The power transmission mechanism further includes a swing movement limiter which holds the swingable member at a specific rotational position of the cam-incorporated gear independently of the surface cam. The lock lever is positioned at the rotation restrictive position and restricts the rotation of the cam-incorporated gear when the cam-incorporated gear is positioned at the specific rotational position, in which the swing movement limiter holds the swingable member.

It is desirable for the cam-incorporated gear to include a lock recess formed at a position different from a position of the surface cam in a direction of a rotational axis of the cam-incorporated gear, and for the lock lever includes a lock lug which can be engaged in and disengaged from the lock recess.

It is desirable for the power transmission mechanism to include another cam-incorporated gear, the planet gear being selectively engaged with the cam-incorporated gear and the another cam-incorporated gear, wherein the another cam-incorporated gear is driven to rotate via the planet gear to control swing movements of the swingable member and another swingable member. A holding force by one of the swingable member and the another swingable member acts on the another cam-incorporated gear when the planet gear is engaged with the cam-incorporated gear.

It is desirable for the power transmission mechanism to be incorporated in an imaging apparatus, the imaging apparatus including a mirror movable between a viewing position, in which the mirror reflects incident light from an imaging optical system toward a viewfinder optical system, and a retracted position, in which the mirror is retracted so that light which is passed through the imaging optical system is incident on an image pickup medium without being reflected by the mirror; and a shutter which prevents the light that is passed through the imaging optical system from being incident on the image pickup medium when shut, and allows the light that is passed through the imaging optical system to be incident on the image pickup medium when opened. The swingable member includes a shutter charge lever that is swingable between a charge release position to allow the shutter to travel and a charge position to carry out a shutter charge operation of the shutter after completion of traveling of the shutter. The another swingable member includes a mirror drive lever that is swingable between a mirror-down position to hold the mirror in the viewing position and a mirror-up position to hold the mirror in the retracted position.

It is desirable for the drive switcher to include a planetary gear mechanism including a sun gear and a planet gear that is engaged with and revolves around the sun gear.

It is desirable for the rotation restrictor to include a swingable member that is swingable about an axis parallel to an axis of rotation of the cam-incorporated gear.

In an embodiment, an imaging apparatus is provided, including a mirror movable between a viewing position, in which the mirror reflects incident light from an imaging optical system toward a viewfinder optical system, and a retracted position, in which the mirror is retracted so that light which is passed through the imaging optical system is incident on an image pickup medium without being reflected by the mirror; a shutter which prevents the light that is passed through the imaging optical system from being incident on the image pickup medium when shut, and allows the light that is passed through the imaging optical system to be incident on the image pickup medium when opened; a mirror drive lever, swingable between a mirror-down position to hold the mirror in the viewing position and a mirror-up position to hold the mirror in the retracted position; a shutter charge lever, swingable between a charge release position to allow the shutter to travel and a charge position to carry out a shutter charge operation of the shutter after completion of traveling of the shutter; a mirror/shutter control cam-incorporated gear which controls swing movements of the mirror drive lever and the shutter charge lever via rotation of the mirror/shutter control cam-incorporated gear; a shutter control cam-incorporated gear which controls the swing movement of the shutter charge lever via rotation of the shutter control cam-incorporated gear; a planetary gear mechanism including a planet gear that selectively engages with the mirror/shutter control cam-incorporated gear and the shutter control cam-incorporated gear, wherein a rotational driving force of a drive source is transmitted to the mirror/shutter control cam-incorporated gear when the planet gear is engaged with the mirror/shutter control cam-incorporated gear, and wherein the rotational driving force of the drive source is transmitted to the shutter control cam-incorporated gear when the planet gear is engaged with the shutter control cam-incorporated gear; and a rotation restrictor which is engageable with at least one of the mirror/shutter control cam-incorporated gear and the shutter control cam-incorporated gear to restrict rotation of one of the mirror/shutter control cam-incorporated gear and the shutter control cam-incorporated gear when the planet gear is engaged with the other of the mirror/shutter control cam-incorporated gear and the shutter control cam-incorporated gear.

It is desirable for the shutter control cam-incorporated gear to include a lock recess which is recessed radially inwards in a direction approaching a rotational axis of the shutter control cam-incorporated gear, and for the rotation restrictor to restricts rotation of the shutter control cam-incorporated gear via engagement with the lock recess when the planet gear is engaged with the mirror/shutter control cam-incorporated gear.

According to the power transmission mechanism of the present invention, the installation of the rotation restrictor that restricts the rotation of the rotational drive member, which is in a state where the transmission of a rotational driving force from the drive source to the rotational drive member is canceled, makes it possible to control the rotational position of the rotational drive member at high precision by restricting the rotation of the rotational drive member.

The present disclosure relates to subject matter contained in Japanese Patent Application No. 2009-144103 (filed on Jun. 17, 2009) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
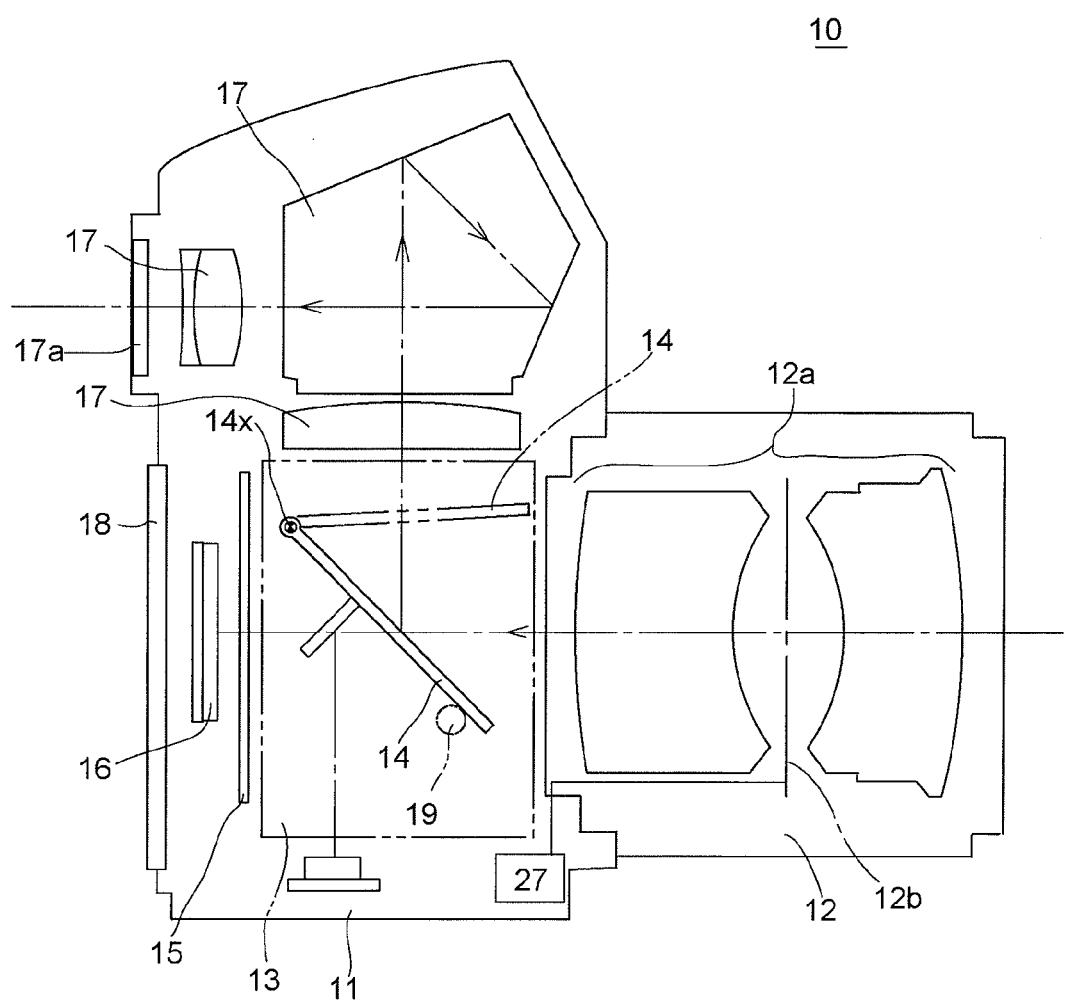
FIG. 1 is a schematic diagram of an optical system of an SLR camera as an example of an imaging apparatus to which a power transmission mechanism according to the present invention is applied.

An SLR digital camera (hereinafter referred simply to as the camera) 10 shown in FIG. 1 is an embodiment of an imaging apparatus according to the present invention. The camera 10 is provided on the front of a camera body 11 with a lens mount (ring-shaped mount) to which a lens barrel (interchangeable lens) 12 is detachably attached, and is further provided behind the lens mount with a mirror box (stationary member) 13. The camera 10 is provided in the mirror box 13 with a quick-return mirror (hereinafter referred simply to as the mirror) 14 which is supported by the mirror box 13 to be swingable about a laterally-extending mirror sheet hinge 14x fixed to the mirror box 13. The camera 10 is provided behind the mirror 14 with a focal plane shutter (hereinafter referred simply to as the shutter) 15 and is provided behind the shutter 15 with an image sensor (image pickup medium) 16.

Figure 5:
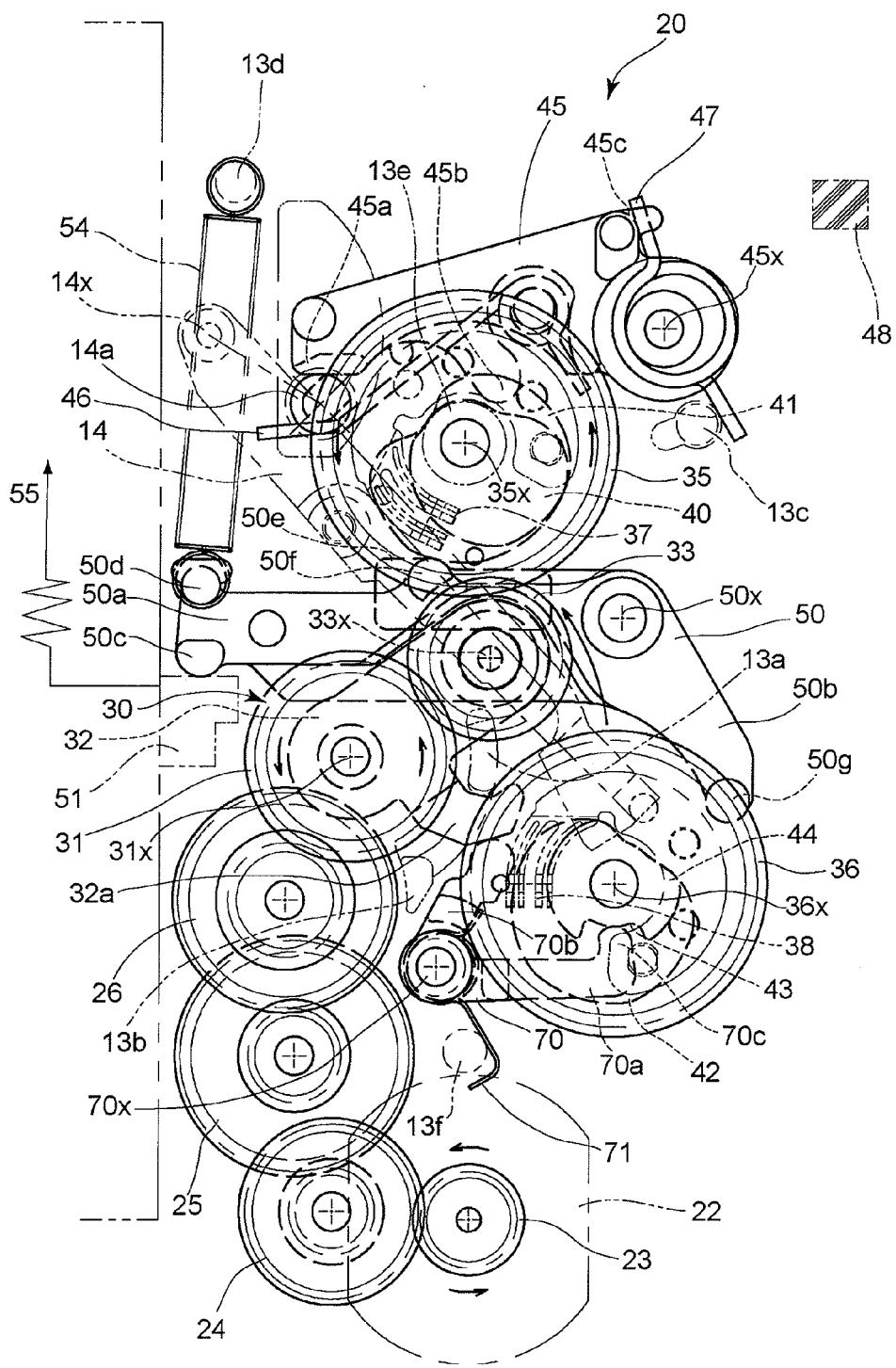
FIG. 5 is a side elevational view of the mirror/shutter drive mechanism in an initial state of a normal photography operational-sequence, in which the mirror is held in the down position (viewing position) on a photographing optical path and the shutter charge operation has been completed.

As shown in FIGS. 1 and 5, the mirror 14 is driven to swing between two positions: a down position (viewing position; shown by a solid line in FIG. 1 and a two-dot chain line in FIG. 5) in which the mirror 14 is positioned in a photographing optical path from a photographic lens (imaging optical system) 12a positioned inside the lens barrel 12 to the image sensor 16, and an upward retracted position (shown by a two-dot chain line in FIGS. 1, 6 through 9) in which the mirror 14 is retracted upward from the aforementioned photographing optical path. The mirror 14 includes a mirror and a mirror sheet which supports the mirror thereon. The portion of the mirror 14 which is shown by two-dot chain lines in FIGS. 5 through 9 is the mirror sheet of the mirror 14. When the mirror 14 is in the down position, light reflected by the mirror 14 is incident on a viewfinder optical system 17 (including a pentagonal prism and an eyepiece) to be viewed as an object image through an eyepiece opening 17a. On the other hand, when the mirror 14 is in the upward retracted position, light passed through the photographic lens 12a travels toward the shutter 15 without being reflected by the mirror 14, and this light can be made incident on the light receiving surface of the image sensor 16 by opening the shutter 15. The camera body 10 is provided on the back of the camera body 11 with an LCD monitor 18. Electronic object images obtained via the image sensor 16 and various information other than electronic object images can be indicated on the LCD monitor 18.

The shutter 15 is provided with a leading curtain 15a and a trailing curtain 15b (both indicated in FIG. 2), each of which can travel in a plane orthogonal to an incident optical axis relative to the image sensor 16. In the operation of the shutter 15 at a time of exposure, the leading curtain 15a and the trailing curtain 15b travel in order with a predetermined time difference therebetween and are thereupon brought back to their previous positions (initial positions) by a shutter charge operation which will be discussed later. The camera 10 is provided therein with a shutter setting lever 51 provided as an element associated with the leading curtain 15a and the trailing curtain 15b of the shutter 15. The shutter setting lever 51 is supported to be swingable about a shaft (not shown). The portion of the shutter setting lever 51 which appears in FIGS. 4 through 9 and 17 through 20 is a free end of the shutter setting lever 51. A swinging movement of the shutter setting lever 51 causes the position of the free end of the shutter setting lever 51 to vary in the vertical direction. The leading curtain 15a and the trailing curtain 15b are mechanically prevented from traveling by the shutter setting lever 51 when the free end thereof is in the shutter holding position shown in FIGS. 5 and 9. The leading curtain 15a and the trailing curtain 15b are allowed to travel when the free end of the shutter setting lever 51 is in the shutter release position shown in FIGS. 6 through 8 that is above the shutter holding position. The shutter setting lever 51 is biased toward the shutter release position by a setting lever restoring spring 55 (shown conceptually in FIGS. 5 through 9 and 17 through 20). The shutter charge operation for the leading curtain 15a and the trailing curtain 15b of the shutter 15 is performed by a movement of the shutter setting lever 51 from the shutter release position to the shutter holding position. The leading curtain 15a and the trailing curtain 15b in a state of having been charged can be held (prevented from traveling) by a leading curtain holding magnet 52 and a trailing curtain holding magnet 53 (both shown in FIG. 2). The leading curtain holding magnet 52 is excited (turned ON) to produce a magnetic attractive force to hold the leading curtain 15a upon being energized, and subsequently, upon the energized state of the leading curtain holding magnet 52 being canceled, the leading curtain holding magnet 52 moves to a non-energized state (OFF state), thus causing the leading curtain 15a to travel. Likewise, the trailing curtain holding magnet 53 is excited (turned ON) to produce a magnetic attractive force to hold the trailing curtain 15b upon being energized, and subsequently, upon the energized state of the trailing curtain holding magnet 53 being canceled, the trailing curtain holding magnet 53 moves to a non-energized state (OFF state), thus causing the trailing curtain 15b to travel.

Figure 3:
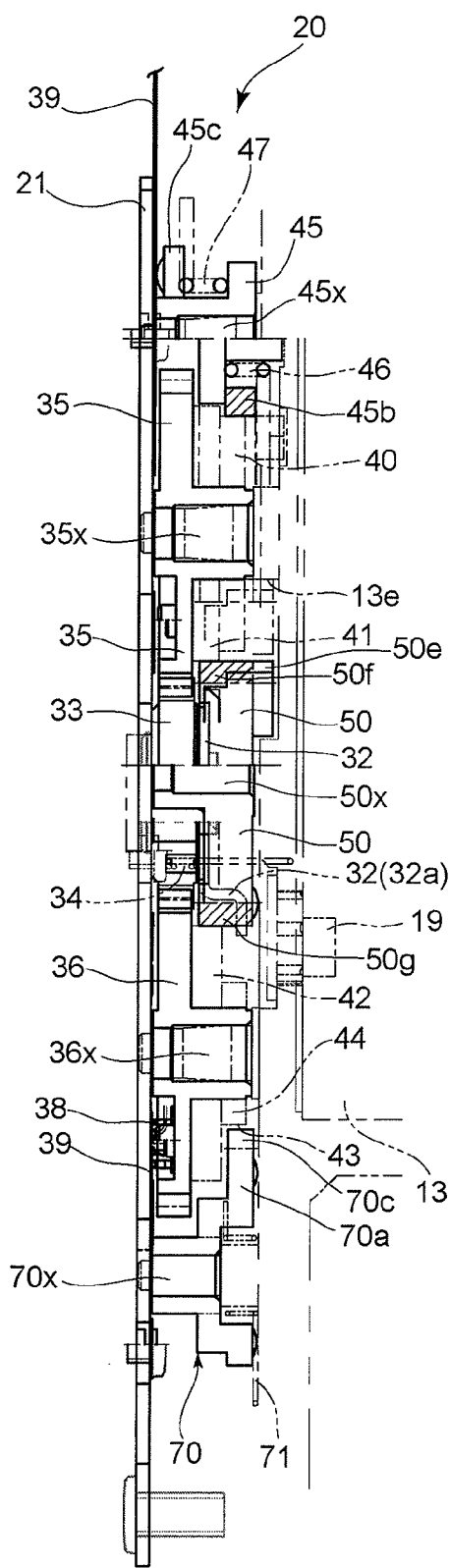
FIG. 3 is a front elevational view of a mirror/shutter drive mechanism installed on a side of a mirror box provided in the SLR camera, showing part of the mirror/shutter drive mechanism in cross section, viewed from front of the SLR camera.
Figure 4:
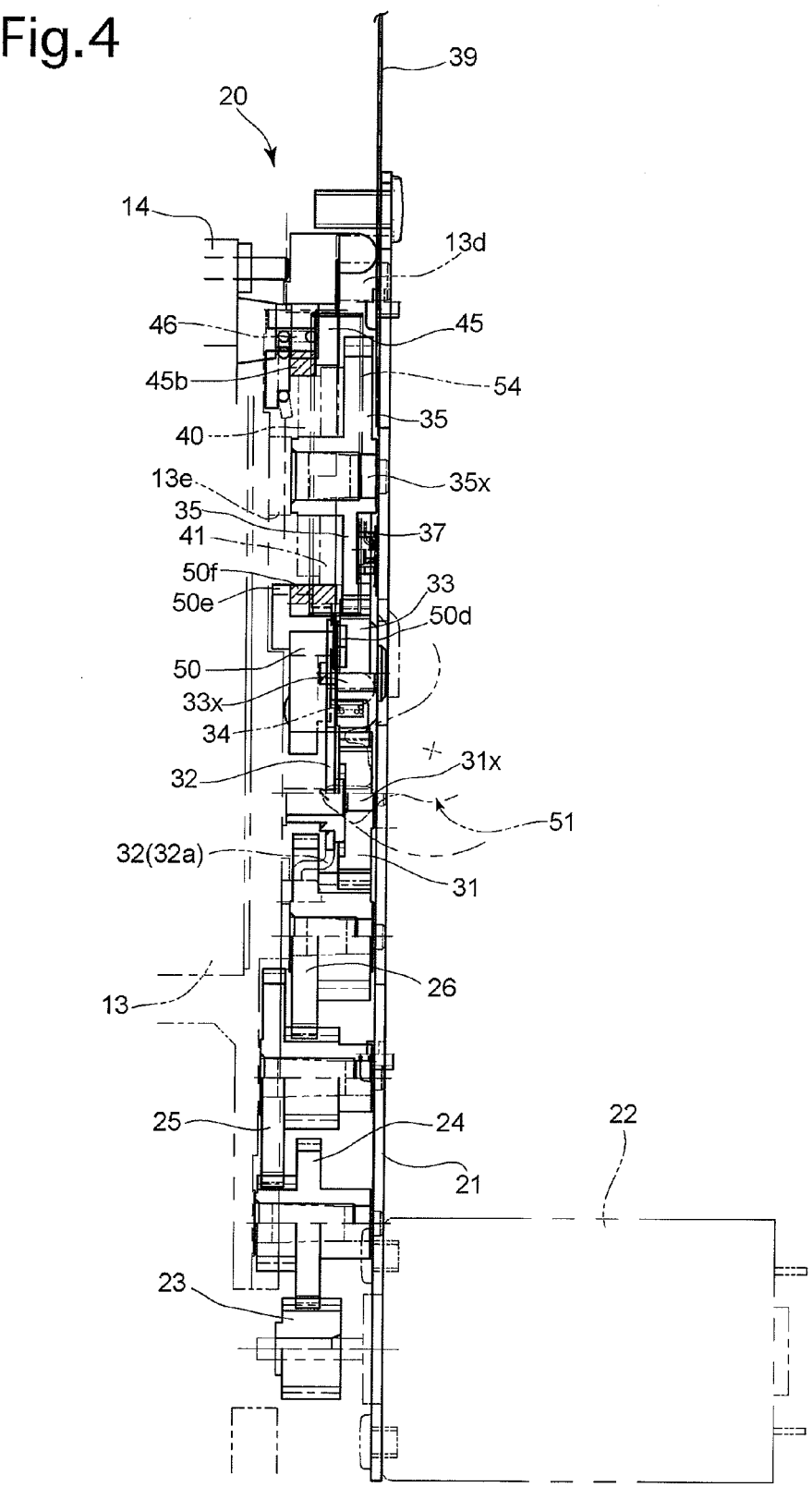
FIG. 4 is a rear elevational view of the mirror/shutter drive mechanism, showing part of the mirror/shutter drive mechanism in cross section, viewed from rear of the SLR camera.
Figure 10:
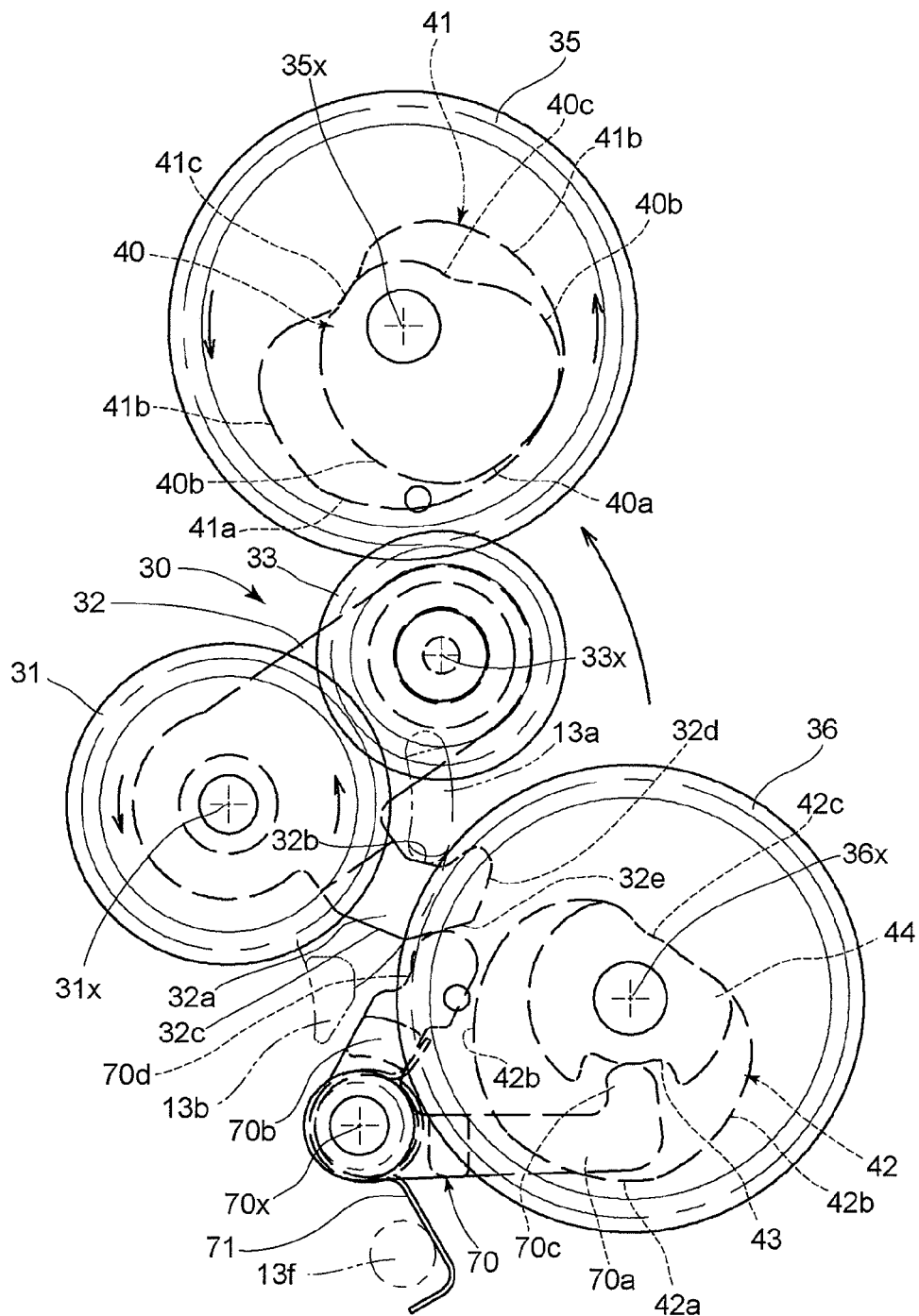
FIG. 10 is a side elevational view of a portion of the mirror/shutter drive mechanism in a state where a motor driving force is transmitted to the first cam-incorporated gear via the planetary gear mechanism, which serves as a component of the mirror/shutter drive mechanism.
Figure 12:
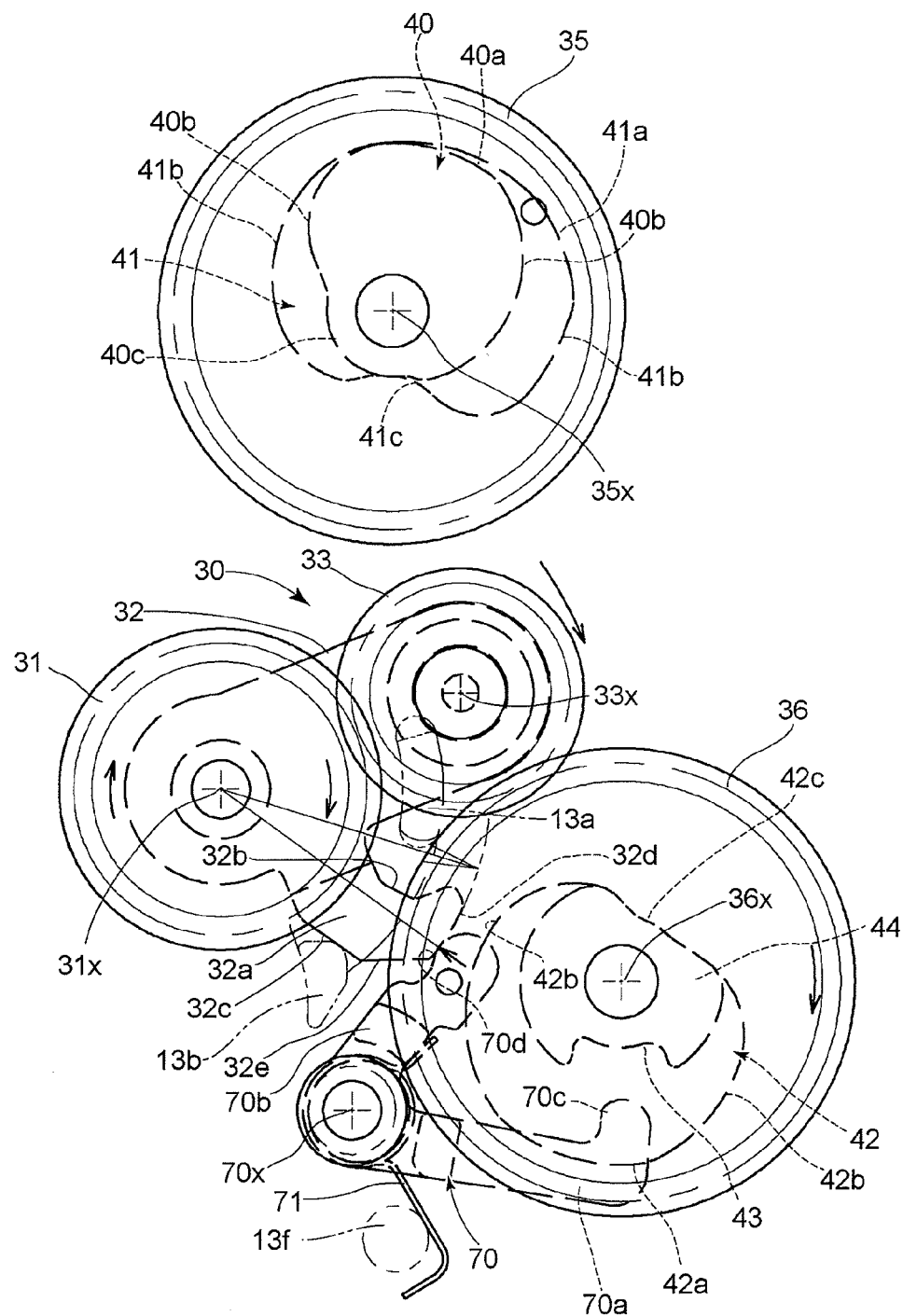
FIG. 12 is a side elevational view of the portion of the mirror/shutter drive mechanism shown in FIG. 11 in a state where a motor driving force is transmitted to the second cam-incorporated gear via the planetary gear mechanism.

The camera 10 is provided on a side of the mirror box 13 with a mirror/shutter drive mechanism (power transmission mechanism) 20. As shown in FIGS. 3 and 4, the camera 10 is provided therein with a cover plate 21 fixed at a position facing a side surface of the mirror box 13 (this position corresponds to a position in front of the paper plane in each of FIGS. 5 through 9) and is further provided therein with a drive motor (drive source) 22 which is supported by the cover plate 21 in the vicinity of the lower end thereof. A motor pinion 23 is fixed on the rotary output shaft of the drive motor 22. The mirror/shutter drive mechanism 20 is provided with a planetary gear mechanism (drive switcher) 30, and rotation of the motor pinion 23 is transmitted to a sun gear 31 of the planetary gear mechanism 30 via a reduction gear train consisting of three reduction gears 24, 25 and 26. As shown in FIGS. 10 and 12, the planetary gear mechanism 30 is provided with a planetary gear arm (swingable arm) 32 swingable about a rotational shaft 31x of the sun gear 31, and is provided with a planet gear 33 which is supported by the free end of the planetary gear arm 32 to be rotatable on a rotational shaft 33x extending parallel to the rotational shaft 31x of the sun gear 31. The planet gear 33 is in mesh with the sun gear 31, and friction (rotational resistance) of a predetermined magnitude is applied between the planet gear 33 and the planetary gear arm 32 by a planetary gear friction spring 34 (see FIGS. 3 and 4).

Figure 11:
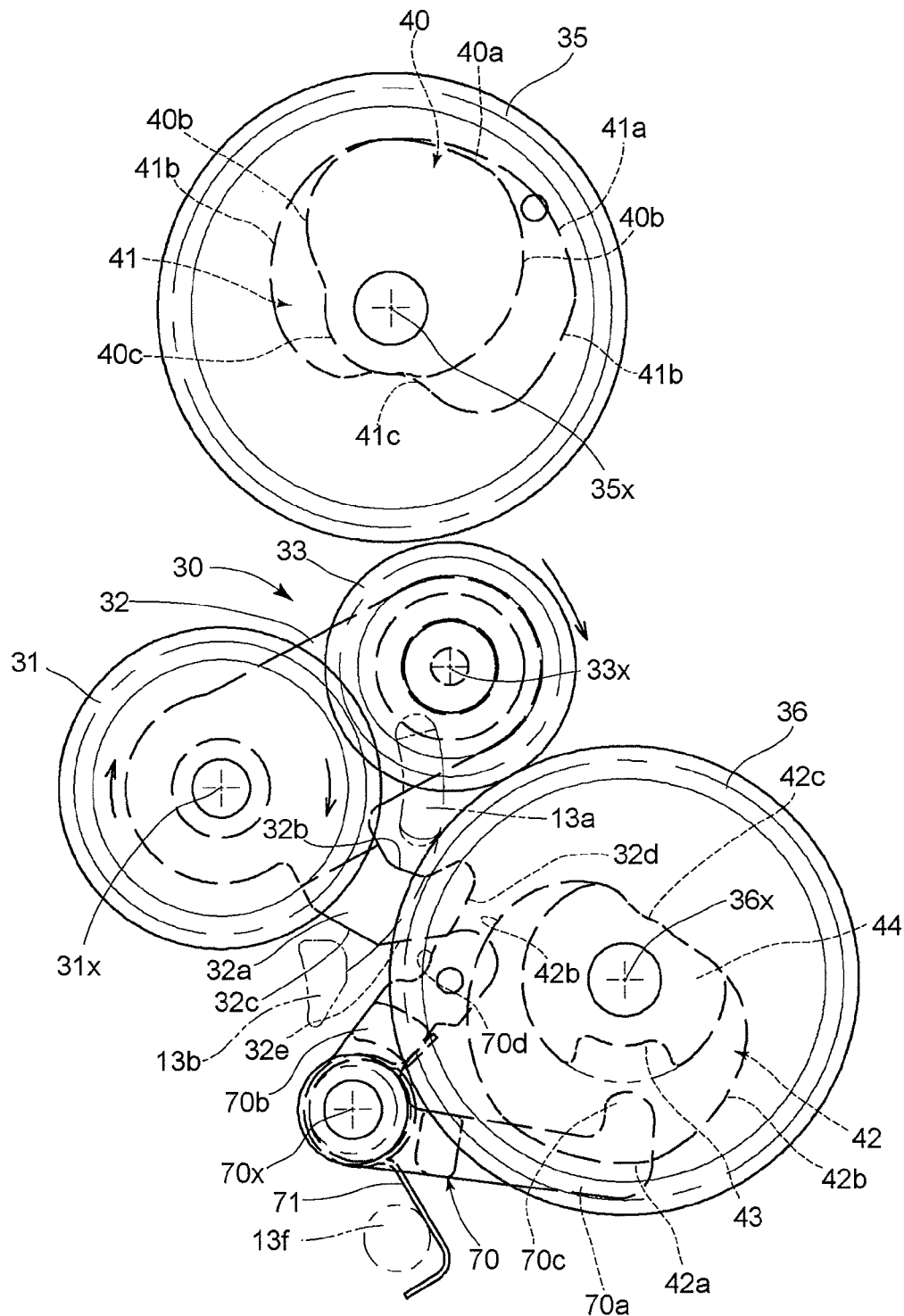
FIG. 11 is a side elevational view of the portion of the mirror/shutter drive mechanism in a state (corresponding to the state shown in FIG. 7) where the target gear to which the motor driving force is transmitted is in the process of changing from the first cam-incorporated gear to the second cam-incorporated gear by the planetary gear mechanism.

The planet gear 33 meshes selectively with a first cam-incorporated gear (a mirror/shutter control cam-incorporated gear) 35 and a second cam-incorporated gear (rotational drive member/shutter control cam-incorporated gear) 36 by a swing motion of the planetary gear arm 32. The planetary gear arm 32 is provided with a sub-arm 32a which extends in a direction transverse to the direction of extension of the planetary gear arm 32 that extends along a straight line which connects the axes of the rotational shaft 31x of the sun gear 31 and the rotational shaft 33x of the planet gear 33. The limit of swing movement of the planetary gear arm 32 in a direction to make the planet gear 33 engage with the first cam-incorporated gear 35 is determined by the engagement between the sub-arm 32a and a swing movement limit protrusion 13a formed on the mirror box 13. In addition, the limit of swing movement of the planetary gear arm 32 in a direction to make the planet gear 33 engage with the second cam-incorporated gear 36 is determined by the engagement between the sub-arm 32a and a swing movement limit protrusion 13b formed on the mirror box 13. More specifically, as shown in FIGS. 10 through 12, the sub-arm 32a is bent into a V-shape. The sub-arm 32a is provided on opposite side end surfaces thereof with a swing movement limit surface 32b and a swing movement limit surface 32c which face the swing movement limit protrusion 13a and the swing movement limit protrusion 13b, respectively. In addition, the sub-arm 32a is provided at a radially outer end thereof with an unlocked-state holding surface 32d and provided between the unlocked-state holding surface 32d and the swing movement limit surface 32c with a lock-lever-pressing beveled surface 32e.

The first cam-incorporated gear 35 and the second cam-incorporated gear 36 are supported by a side of the mirror box 13 and the cover plate 21 therebetween to be rotatable on a rotational shaft 35x and a rotational shaft 36x, respectively, each of which is parallel to the rotational shaft 33x of the planet gear 33. Each of the first cam-incorporated gear 35 and the second cam-incorporated gear 36 is provided on the outer peripheral surface thereof with a circumferential gear (gear teeth) engageable with the planet gear 33. The first cam-incorporated gear 35 and the second cam-incorporated gear 36 are substantially identical in diameter to each other. In addition, the first cam-incorporated gear 35 and the second cam-incorporated gear 36 are mutually identical in the number of gear teeth on the outer peripheral surface (i.e., reduction ratio is 1:1). The first cam-incorporated gear 35 and the second cam-incorporated gear 36 are provided on surfaces thereof facing the cover plate 21 with a code plate brush 37 and a code plate brush 38, respectively. A code plate 39 (see FIGS. 3 and 4), with which the code plate brushes 37 and 38 are in sliding contact, is supported by the cover plate 21. Due to conduction of electricity between each code plate brush 37 and 38 and the pattern of traces formed on the code plate 39, specific rotation positions of each cam-incorporated gear 35 and 36 are detected. Such detectable rotation positions of the cam-incorporated gears 35 and 36 will be discussed in detail later. All the rotational shafts of the above described gears ranging from the motor pinion 23 to the first and second cam-incorporated gears 35 and 36 are substantially parallel to the axis of the mirror sheet hinge 14x.

The first cam-incorporated gear 35 is provided, on a surface thereof opposite to the surface to which the code plate brush 37 is fixed, with a mirror control cam 40 and a first shutter control cam 41. As shown in FIGS. 10 through 12, 17 and 18, the mirror control cam 40 is provided with a constant-radius cam portion 40a, two non-constant-radius cam portions 40b, and a relief cam portion 40c, and the first shutter control cam 41 is provided with a constant-radius cam portion 41a, two non-constant-radius cam portions 41b and a relief (recessed) cam portion 41c. The constant-radius cam portion 40a is greater in radius than the two non-constant-radius cam portions 40b and the relief cam portion 40c, is formed at the maximum outer radial position on the mirror control cam 40 about the rotational shaft 35x and shaped so that the radial distance from the rotational shaft 35x to the constant-radius cam portion 40a does not vary in the rotational direction about the rotational shaft 35x. The relief cam portion 40c is smaller in radius than the constant-radius cam portion 40a and the two non-constant-radius cam portions 40b, and is formed at a position on the mirror control cam 40 which is closer to the rotational shaft 35x than the constant-radius cam portion 40a in a radial direction. The two non-constant-radius cam portions 40b are formed between the constant-radius cam portion 40a and the relief cam portion 40c so that the constant-radius cam portion 40a and the relief cam portion 40c are connected via the two non-constant-radius cam portions 40b, and each non-constant-radius cam portion 40b is shaped so that the distance from the rotational shaft 35x to the non-constant-radius cam portion 40b varies in the rotational direction about the rotational shaft 35x. Similarly, the constant-radius cam portion 41a is greater in radius than the two non-constant-radius cam portions 41b and the relief cam portion 41c, is formed at the maximum outer radial position on the first shutter control cam 41 about the rotational shaft 35x and shaped so that the radial distance from the rotational shaft 35x to the constant-radius cam portion 41a does not vary in the rotational direction about the rotational shaft 35x. The relief cam portion 41c is smaller in radius than the constant-radius cam portion 41a and the two non-constant-radius cam portions 41b, and is formed at a position on the first shutter control cam 41 which is closer to the rotational shaft 35x than the constant-radius cam portion 41a in a radial direction. The two non-constant-radius cam portions 41b are formed between the constant-radius cam portion 41a and the relief cam portion 41c so that the constant-radius cam portion 41a and the relief cam portion 41c are connected via the two non-constant-radius cam portions 41b, and each non-constant-radius cam portion 41b is shaped so that the distance from the rotational shaft 35x to the non-constant-radius cam portion 41b varies in the rotational direction about the rotational shaft 35x.

The second cam-incorporated gear 36 is provided, on a surface thereof opposite to the surface to which the code plate brush 38 is fixed, with a second shutter control cam (surface cam) 42. As shown in FIGS. 10 through 12, 19 and 20, the second shutter control cam 42 is provided with a constant-radius cam portion 42a, two non-constant-radius cam portions 42b and a relief cam portion 42c. The constant-radius cam portion 42a is greater in radius than the two non-constant-radius cam portions 42b and the relief cam portion 42c, is formed at the maximum outer radial position on the second shutter control cam 42 about the rotational shaft 36x and shaped so that the radial distance from the rotational shaft 36x to the constant-radius cam portion 42a does not vary in the rotational direction about the rotational shaft 36x. The relief cam portion 42c is smaller in radius than the constant-radius cam portion 42a and the two non-constant-radius cam portions 42b, and is formed at a position on the second shutter control cam 42 which is closer to the rotational shaft 36x than the constant-radius cam portion 42a in a radial direction. The two non-constant-radius cam portions 42b are formed between the constant-radius cam portion 42a and the relief cam portion 42c so that the constant-radius cam portion 42a and the relief cam portion 42c are connected via the two non-constant-radius cam portions 42b, and each non-constant-radius cam portion 42b is shaped so that the distance from the rotational shaft 36x to the non-constant-radius cam portion 42b varies in the rotational direction about the rotational shaft 36x. In addition, the second cam-incorporated gear 36 is provided with a lock piece 44 at a position different from (adjacent to/next to) the position of the second shutter control cam 42 in the direction of the axis of the rotational shaft 36x (see FIG. 3), and the lock piece 44 is provided on a peripheral surface thereof with a lock recess 43 which is recessed radially inwards in a direction approaching the rotational shaft 36x.

Figure 13:
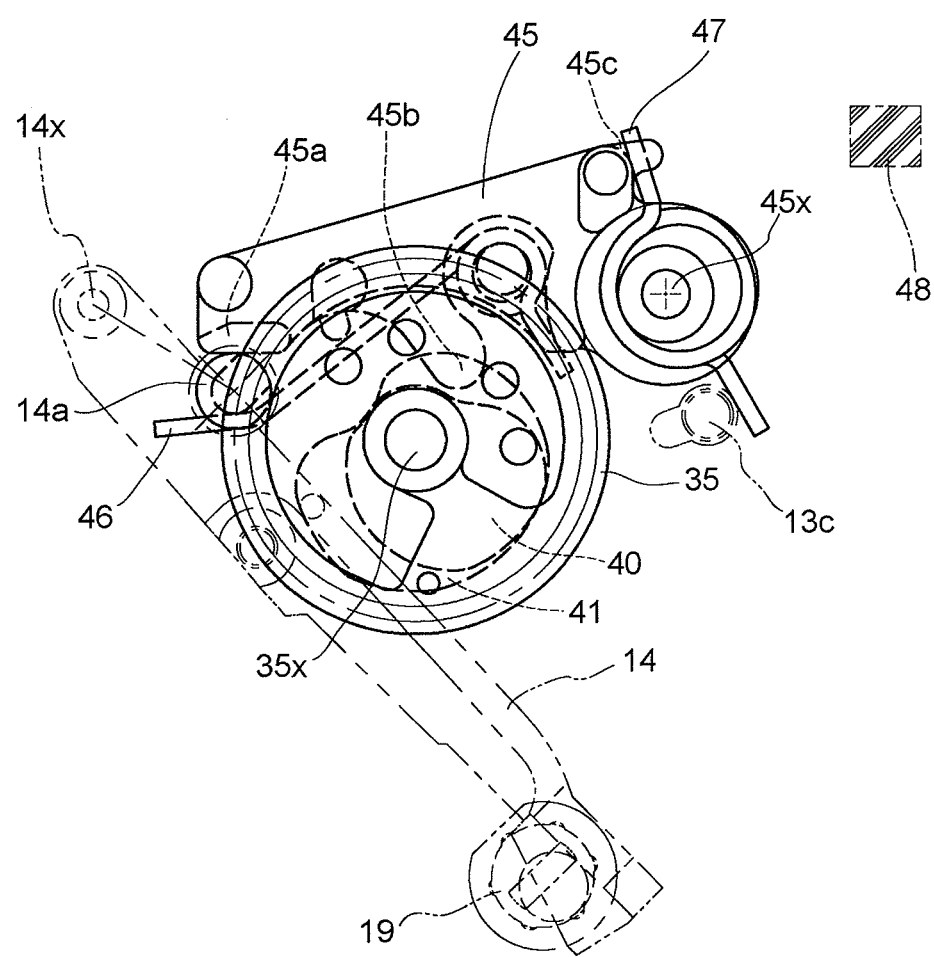
FIG. 13 a side elevational view of a portion of the mirror/shutter drive mechanism in a state where the mirror is held in the down position, in which the mirror is in contact with a limit pin, while a mirror drive lever is held in the mirror-down position.
Figure 17:
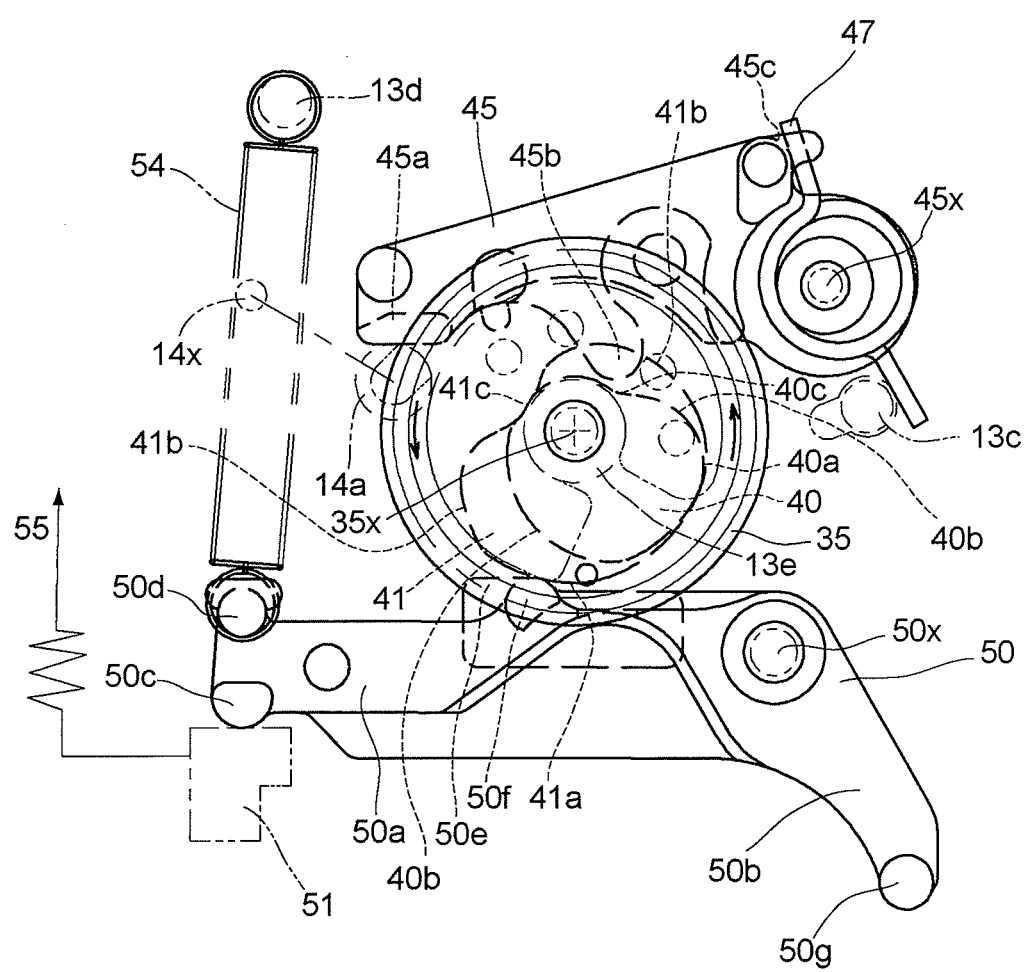
FIG. 17 is a side elevational view of the first cam-incorporated gear, the mirror drive lever, the shutter charge lever and associated elements, showing the relative positions between the first cam-incorporated gear, the mirror drive lever and the shutter charge lever when the first cam-incorporated gear is positioned at the origin position thereof shown in FIG. 5.

The mirror/shutter drive mechanism 20 is provided between a side of the mirror box 13 and the cover plate 21 with a mirror drive lever (swingable member) 45 which is supported therebetween to be swingable about a rotational shaft 45x substantially parallel to the axis of the mirror sheet hinge 14x. The mirror drive lever 45 is provided in the vicinity of the free end thereof (left end with respect to FIGS. 5 through 9) with a mirror retaining portion 45a. The mirror 14 is provided on the mirror sheet thereof with a mirror sheet boss 14a which is held between the mirror retaining portion 45a and a mirror-up spring 46. The mirror 14 is driven to swing between the aforementioned down position and the aforementioned upward retracted position in accordance with the swing operation of the mirror drive lever 45. Namely, the mirror drive lever 45 is driven to swing between a mirror-down position (shown in FIGS. 5 and 17), in which the mirror 14 is held in the down position within a photographing optical path, and a mirror-up position (shown in FIGS. 6 through 9 and 18) in which the mirror 14 is held in the upward retracted position. The mirror drive lever 45 is biased to rotate toward the mirror-down position by a mirror-down spring 47. The mirror-down spring 47 is made up of a torsion spring which includes a coiled portion positioned around the rotational shaft 45x of the mirror drive lever 45 and a pair of arms extending from the coiled portion. One of the pair of arms of the mirror-down spring 47 is hooked onto a spring hook 45c of the mirror drive lever 45 and the other arm is hooked onto a spring engaging projection 13c provided on a side of the mirror box 13. As shown in FIGS. 5 and 17, when the mirror drive lever 45 is in the mirror-down position, the mirror retaining portion 45a presses the mirror sheet boss 14a downward to hold the mirror 14 in the down position. As shown in FIGS. 3 and 13, a limit pin 19 which determines the down position of the mirror 14 is fixed to the mirror box 13, and the mirror drive lever 45 is held in the mirror down position by making the mirror retaining portion 45a in contact the mirror sheet boss 14a of the mirror 14, which is prevented from rotating by the limit pin 19. On the other hand, the mirror control cam 40 of the first cam-incorporated gear 35 can come in contact with a cam follower 45b formed on the mirror drive lever 45. Rotating the first cam-incorporated gear 35 to the position (mirror-up completion position) shown in FIGS. 6 through 9 and 18 causes the constant-radius cam portion 40a of the mirror control cam 40 to press the cam follower 45b upward, thus making it possible to hold the mirror drive lever 45 in the mirror-up position against the biasing force of the mirror-down lever 47. When the mirror drive lever 45 is in the mirror-up position, the mirror-up spring 46 lifts the mirror sheet boss 14a to hold the mirror 14 in the upward retracted position. At this time, the mirror-up spring 46 is slightly bent to thereby absorb any error in the amount of rotation of the mirror drive lever 45, which makes it possible to hold the mirror 14 in the upward retracted position reliably. In addition, the mirror box 13 is provided therein with a shock absorber (mirror cushion) 48 against to which the mirror 14 in the vicinity of the front end (free end) thereof abuts upon the mirror 14 being retracted to the upward retracted position.

The mirror/shutter drive mechanism 20 is also provided between a side of the mirror box 13 and the cover plate 21 with a shutter charge lever (driven member/swingable member) 50 which is supported therebetween to be swingable about a rotational shaft 50x substantially parallel to the axis of the mirror sheet hinge 14x. The shutter charge lever 50 is provided with a first arm 50a and a second arm 50b which extend in different directions with the rotational shaft 50x as a center. The shutter charge lever 50 is provided at a free end of the first arm 50a with an end contacting portion 50c which can come into contact with the free end of the shutter setting lever 51. The shutter charge lever 50 is swingable between two positions: a charge position (shown in FIGS. 5, 9, 17 and 20) to depress the shutter setting lever 51 to a shutter holding position via the end contacting portion 50c, and a charge release position (shown in FIGS. 6 through 8, 18 and 19) to be disengaged from the shutter setting lever 51 to thereby allow the shutter setting lever 51 to move to the shutter release position (shown in FIGS. 6 through 8, 18 and 19). The shutter charge lever 50 is biased to rotate toward the charge release position by a charge lever restoring spring 54. The charge lever restoring spring 54 is an extension spring, one and the other ends of which are hooked onto a spring engaging projection 50d formed on the first arm 50a and a spring engaging projection 13d formed on a side of the mirror box 13, respectively. The limit of swing movement of the shutter charge lever 50 in the biasing direction of the charge lever restoring spring 54 (i.e., the charge release position of the shutter charge lever 50) is determined by making a stopper portion (an element of a swing movement limiter) 50e (see FIGS. 19 and 20) formed on the first arm 50a come in contact with a swing limit protrusion (an element of the swing movement limiter) 13e (see FIGS. 3 through 9, 17 and 18). In addition, the first arm 50a is provided thereon with a first cam follower 50f and the second arm 50b is provided thereon with a second cam follower 50g. The first cam follower 50f and the second cam follower 50g are substantially the same distance from the rotational shaft 50x. The first shutter control cam 41 of the first cam-incorporated gear 35 can come in contact with the first cam follower 50f and the second shutter control cam 42 of the second cam-incorporated gear 36 can come in contact with the second cam follower 50g. When the first cam-incorporated gear 35 is at the position (origin position) shown in FIGS. 5 and 17, the shutter charge lever 50 can be held in the charge position against the biasing force of the charge lever restoring spring by depressing the first cam follower 50f via the constant-radius cam portion 41a of the first shutter control cam 41. Likewise, also by rotating the second cam-incorporated gear 36 to the position (shutter charge completion position) shown in FIGS. 9 and 20, the shutter charge lever 50 can be held in the charge position against the biasing force of the charge lever restoring spring 54 by pushing up the second cam follower 50g via the constant-radius cam portion 42a of the second shutter control cam 42.

The mirror/shutter drive mechanism 20 is further provided between a surface of the mirror box 13 and the cover plate 21 with a lock lever (rotation restrictor) 70 which is supported therebetween to be swingable about a rotational shaft 70x that is substantially parallel to the axis of the mirror sheet hinge 14x. The lock lever 70 is provided with a lock arm 70a and a driven arm 70b which extend in different directions from the rotational shaft 70x to be shaped into a substantially L-shape. The lock arm 70a is provided at a radially outer end thereof with a lock lug 70c which can be engaged in the lock recess 43 of the lock piece 44 of the second cam-incorporated gear 36. The driven arm 70b is provided on a side end surface thereof with an unlocked-state holding surface 70d engageable with the unlocked-state holding surface 32d of the planetary gear arm 32 (i.e., the sub-arm 32a thereof). The lock lever 70 is biased to rotate by a lock lever biasing spring (biaser) 71 in a direction to make the lock lug 70c engage with the lock piece 44 (i.e., in a direction to make the driven arm 70b approach the sub-arm 32a), namely, in the counterclockwise direction with respect to FIGS. 5 through 12, 19 and 20. The lock lever biasing spring 71 is configured from a torsion spring which includes a coiled portion provided around the rotational shaft 70x of the lock lever 70 and a pair of arms extending from the coiled portion. One of the pair of arms of the lock lever biasing spring 71 is engaged with the driven arm 70b of the lock lever 70 and the other arm of the lock lever biasing spring 71 is engaged with a spring engaging projection 13f formed on a side of the mirror box 13. The rotation of the lock lever 70 in the biasing direction of the lock lever biasing spring 71 can be limited by the engagement of the sub-arm 32a with the driven arm 70b. More specifically, in a state where the sub-arm 32a is spaced apart from the driven arm 70, the lock lever 70 can rotate by the biasing force of the lock lever biasing spring 71 to a position where the end of the lock lug 70c comes in contact with the lock recess 43. On the other hand, upon the driven arm 70b receiving pressure from the sub-arm 32a, the lock lever 70 rotates in a direction to disengage the lock lug 70c from the lock recess 43 against the biasing force of the lock lever biasing spring 71.

In other words, a variation in angular position of the planetary gear arm 32 (the sub-arm 32a) about the rotational shaft 31x can make the lock lever 70 swing. A clockwise rotation of the planetary gear arm 32 with respect to FIGS. 10 through 12 causes the planetary gear arm 32 to press the lock lever 70 so that the lock lever 70 rotates clockwise against the biasing force of the lock lever biasing spring 71, and a counterclockwise rotation of the planetary gear arm 32 with respect to FIGS. 10 through 12 causes the lock lever 70 to follow the counterclockwise rotation of the planetary gear arm 32 by the biasing force of the lock lever biasing spring 71, thus causing the lock lever 70 to rotate counterclockwise. When the planetary gear arm 32 is in an angular position to make the planet gear 33 engage with the first cam-incorporated gear 35 as shown in FIG. 10, the lock lever 70 is held in a position so as to insert the lock lug 70c into the lock recess 43 by the biasing force of the lock lever biasing spring 71 to restrict the rotation of the second cam-incorporated gear 36 by the engagement of the lock lug 70c with the lock recess 43 (the lock piece 44). The position (swing limit) of the lock lever 70 at this time is herein referred to as the locked position. On the other hand, as shown in FIG. 12, when the planetary gear arm 32 is in an angular position to make the planet gear 33 engage with the second cam-incorporated gear 36, the lock lever 70 is pressed by the sub-arm 32a in a direction against the biasing force of the lock lever biasing spring 71 to be held in a position to make the lock lug 70c disengage from the lock recess 43 (so that the lock lug 70c is positioned radially outside of the lock piece 44), thus not restricting the rotation of the second cam-incorporated gear 36. The position (swing limit) of the lock lever 70 at this time is herein referred to as the unlocked position. The relationship between the width of the lock lug 70c and the width of the opening of the lock recess 43 is determined depending on the allowable range of rotation of the second cam-incorporated gear 36 in a state where the lock lug 70c is engaged in the lock recess 43. For instance, the width of the opening of the lock recess 43 can be widened if this allowable range of rotation is wide or can be narrowed if the same range is narrow (within the range allowing the lock lug 70c to be engaged in the lock recess 43).

In addition to the mirror/shutter drive mechanism 20, the camera body 10 is provided with a diaphragm control mechanism 27 (conceptually shown in FIG. 1) for controlling driving of an adjustable diaphragm 12b provided in the lens barrel 12. The diaphragm control mechanism 27 is driven by a drive source different from the drive motor 22 of the mirror/shutter drive mechanism 20. During a live view operation (real-time preview operation) that will be discussed later, the size of the aperture opening (f-number) of the adjustable diaphragm 12b can be adjusted according to brightness information of the object image obtained via the image sensor 16.

Figure 2:
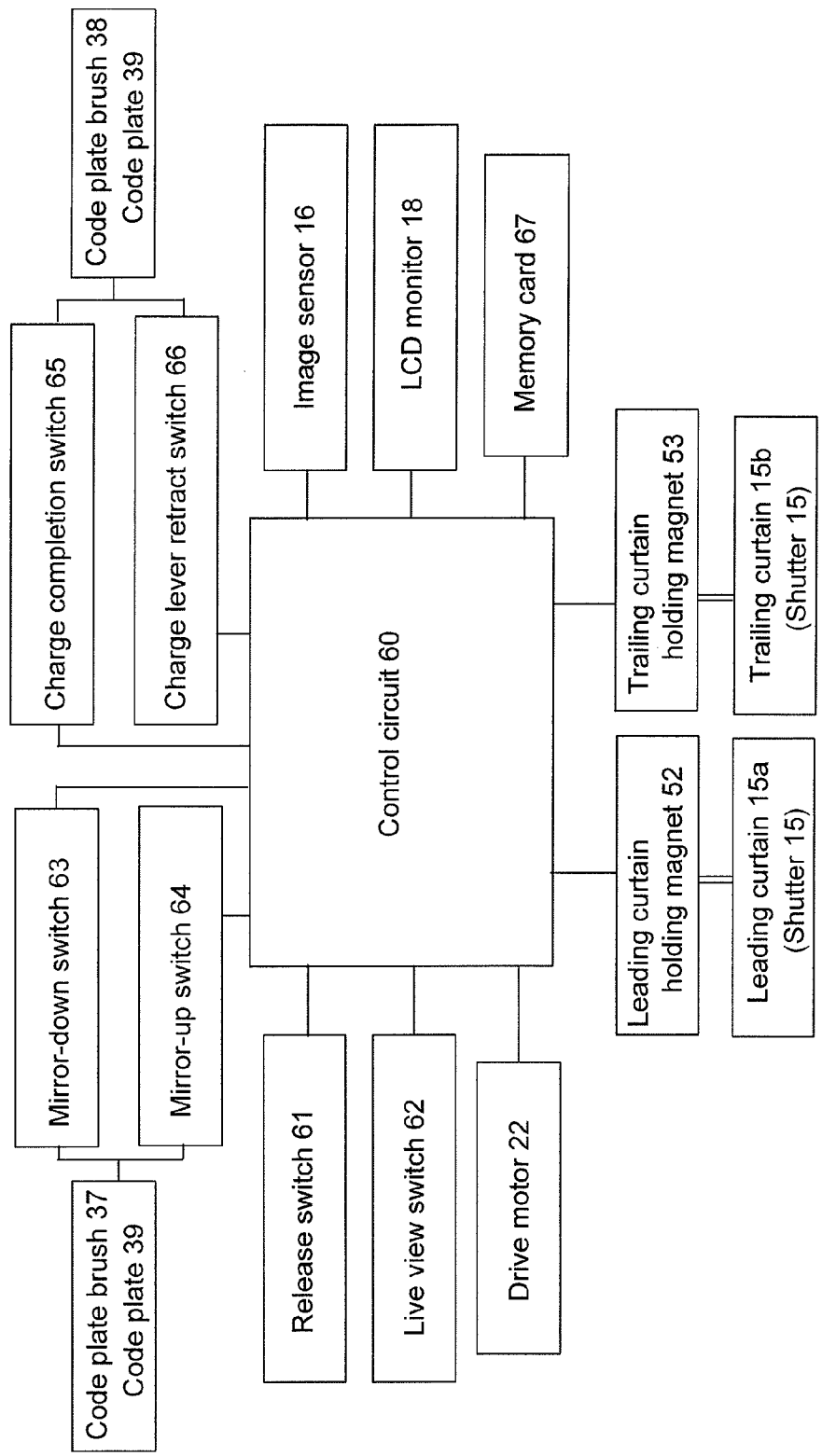
FIG. 2 is a block diagram of main elements of a control system of the SLR camera.

FIG. 2 is a block diagram showing main elements of a control system of the camera 10. Although the camera 10 is equipped with an exposure control system, which is associated with settings of the f-number that are determined by the diaphragm control mechanism 27 and settings of the shutter speed, and an autofocus system that operates based on object distance information, such systems are omitted from the block diagram in FIG. 2 for the sake of brevity. As shown in FIG. 2, the control system is provided with a control circuit 60, and is provided with a release switch 61, a live view switch 62, a mirror-down switch 63, a mirror-up switch 64, a charge completion switch 65 and a charge lever retract switch 66 that are all connected to the control circuit 60. In response to signals input from the release switch 61, the live view switch 62, the mirror-down switch 63, the mirror-up switch 64, the charge completion switch 65 and the charge lever retract switch 66, the control circuit 60 controls the operations of the drive motor 22, the leading-curtain holding magnet 52 and the trailing-curtain holding magnet 53 in accordance with programs stored in internal memory. The release switch 61 can be turned ON by depressing a release button (not shown) provided on an outer surface of the camera body 11. The live view switch 62 can be turned ON and OFF by depressing a live view button (not shown) provided on the outer surface of the camera body 11.

The ON/OFF states of the mirror-down switch 63 and the mirror-up switch 64 are input to the control circuit 60 as rotational position information of the first cam-incorporated gear 35 that is detected by the code plate brush 37 and the code plate 39. More specifically, the mirror-down switch 63 is turned ON upon the first cam-incorporated gear 35 rotating to the rotational position (origin position) shown in FIGS. 5 and 17, and the mirror-up switch 64 is turned ON upon the first cam-incorporated gear 35 rotating to the rotational position (mirror-up completion position) shown in FIGS. 6 and 18. The ON/OFF states of the charge completion switch 65 and the charge lever retract switch 66 are input to the control circuit 60 as rotational position information of the second cam-incorporated gear 36 that is detected by the code plate brush 38 and the code plate 39. More specifically, the charge completion switch 65 is turned ON upon the second cam-incorporated gear 36 rotating to the rotational position (shutter charge completion position) shown in FIGS. 9 and 20, and the charge lever retract switch 66 is turned ON upon the second cam-incorporated gear 36 rotating to the rotational position (origin position) shown in FIGS. 8 and 19.

The control circuit 60 includes an image processing circuit. This image processing circuit processes object image formed on the light receiving surface of the image sensor 16 to produce electronic image data, stores this produced image data in a recording medium such as a memory card 67, and makes the LCD monitor 18 display the electronic image.

Operations of the camera 10 that has the above described structure will be discussed hereinafter. The rotational directions of the cam-incorporated gears 35 and 36 which will be referred to in the following descriptions of the operations of the camera 10 are based on the drawings in FIGS. 5 through 13 and 17 through 20.

FIGS. 5 and 17 show an initial state of the mirror/shutter drive mechanism 20 in normal exposure mode (normal view mode/optical view mode). In this initial state, the mirror 14 is held in the down position while being in contact with the limit pin 19, and the mirror drive lever 45 is held in the mirror-down position with the mirror retaining portion 45a thereof being in contact with mirror sheet boss 14a by the biasing force of the mirror-down spring 47. At this time, the mirror drive lever 45 is in a state where the cam follower 45b is positioned closest to the rotational shaft 35x of the first cam-incorporated gear 35, and the cam follower 45b faces the relief cam portion 40c of the mirror control cam 40 with a slight distance therebetween. In addition, the shutter charge lever 50 is held in the charge position by the engagement of the first cam follower 50f with the constant-radius cam portion 41a. At this time, the shutter charge lever 50 is in a state where the first cam follower 50f is spaced most apart from the rotational shaft 35x of the first cam-incorporated gear 35 while the amount of extension of each of the charge lever restoring spring 54 and the setting lever restoring spring 55 is maximum. In addition, the shutter lever 51 is depressed by the end contacting portion 50c of the shutter charge lever 50 to be held in the shutter holding position. On the other hand, the second shutter control cam 42 of the second cam-incorporated gear 36 is not in contact with the second cam follower 50g and thus not involved in the position control for the shutter charge lever 50. At this time, the shutter 15 has been already charged, and the presence of the shutter setting lever 51 in the shutter holding position mechanically prevents the leading curtain 15a and the trailing curtain 15b from traveling. Additionally, each of the leading curtain holding magnet 52 and the trailing curtain holding magnet 53 is in the OFF state.

The rotational positions of the first cam-incorporated gear 35 and the second cam-incorporated gear 36 in the above described initial state of the mirror/shutter drive mechanism 20 are designated as the origin positions of the first cam-incorporated gear 35 and the second cam-incorporated gear 36, respectively. In addition, in this initial state of the mirror/shutter drive mechanism 20, the planetary gear mechanism 30 is in a state where the planet gear 33 is in mesh with the first cam-incorporated gear 35 (see FIG. 10). In other words, the planetary gear mechanism 30 is in a transmission-OFF state in which the transmission of the driving force of the drive motor 22 to the second cam-incorporated gear 36 is canceled. The lock lever 70 is held in the locked position, in which the lock lug 70c is engaged in the lock recess 43, by the biasing force of the lock lever biasing spring 71, so that the rotation of the second cam-incorporated gear 36 is restricted. As can be seen from FIG. 10, when the lock lever 70 is in the locked position, the end of the lock lug 70c is in contact with the bottom of the lock recess 43, which prevents the lock lever 70 from rotating in a lock direction (the biasing direction of the lock lever biasing spring 71). At this time, the drive arm 70b of the lock lever 70 is slightly spaced from the sub-arm 32a of the planetary gear arm 32. Namely, in this initial state of the mirror/shutter drive mechanism 20, the second cam follower 50g of the shutter charge lever 50 is not in contact with the second shutter control cam 42 of the second cam-incorporated gear 36, so that no holding force by the shutter charge lever 50 acts on the second cam follower 50g; however, the rotation of the second cam-incorporated gear 36 is restricted by the engagement of the lock lug 70c with the lock recess 43. By holding the second cam-incorporated gear 36 at the origin position by the lock lever 70 in such a manner, the second shutter control cam 42 of the second cam-incorporated gear 36 does not come in contact with the second cam follower 50g during the time the actuation control of the shutter charge lever 50 is performed by the first cam-incorporated gear 35 (during the time the planetary gear mechanism 30 is connected to the first cam-incorporated gear side), and accordingly, during this time there is no possibility of a malfunction of the shutter charge lever 50 which may be caused by a displacement of the second cam-incorporated gear 36 occurring.

Figure 14:
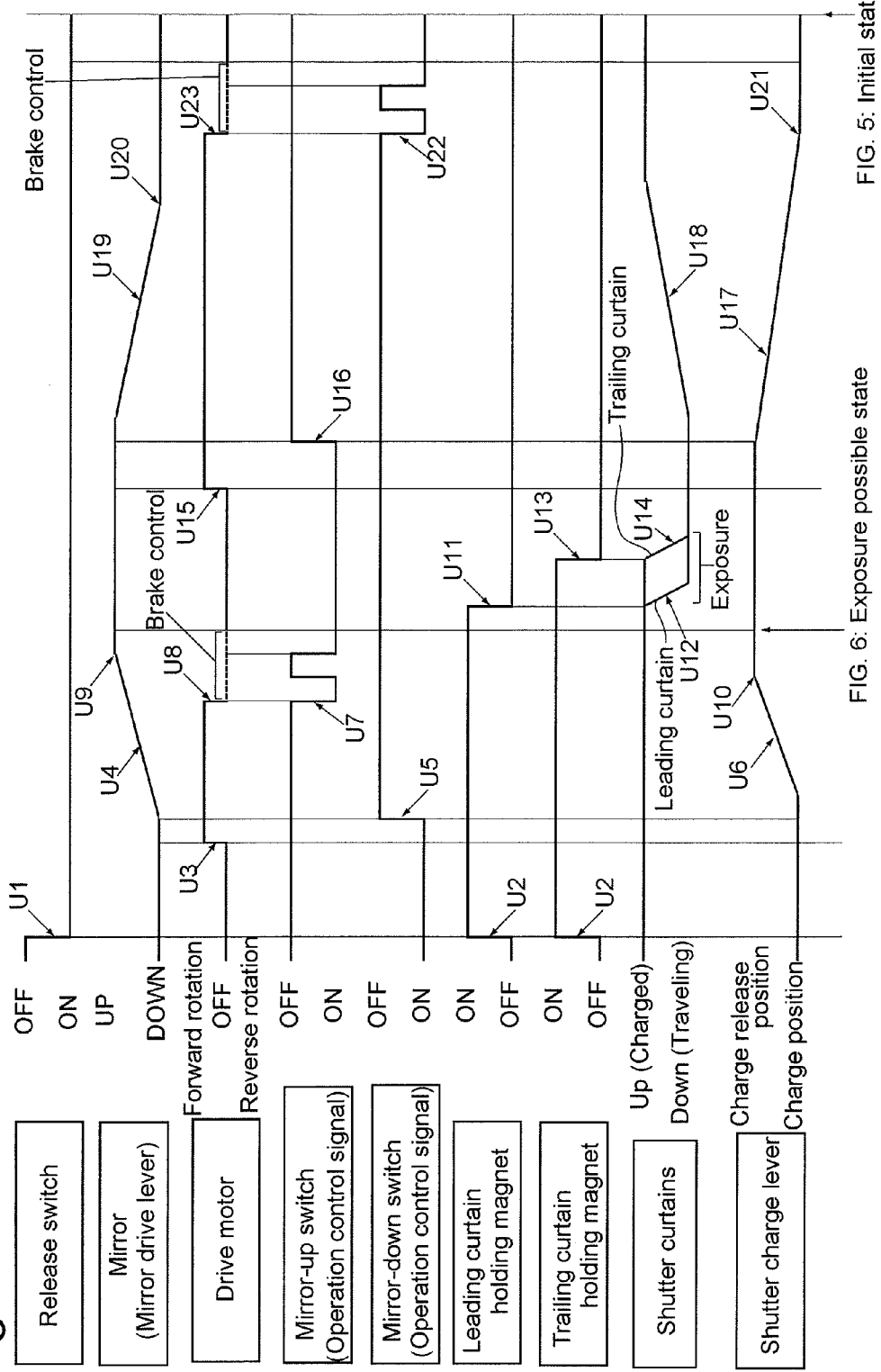
FIG. 14 is a timing chart showing a normal photography operational-sequence in normal exposure mode (normal view mode/optical view mode)

In this initial state, upon the release switch 61 being turned ON, a photographing operation in the normal exposure mode that is shown in the timing chart shown in FIG. 14 is performed. In the normal exposure mode, the driving of the drive motor 22 is controlled so that the motor pinion 23 rotates counterclockwise with respect to FIG. 5. This direction of rotation of the drive motor 22 will be hereinafter referred to as the forward rotational direction. In addition, the driving direction of the drive motor 22 to rotate the motor pinion 23 in the reverse direction, i.e., clockwise with respect to FIG. 5 will be hereinafter referred to as the reverse rotational direction. Upon the release switch 61 being turned ON (see U1 shown in FIG. 14; refer to FIG. 14 when a numeral with the prefix "U" is found in the following descriptions), firstly the leading curtain holding magnet 52 and the trailing curtain holding magnet 53 are energized to electromagnetically hold the leading curtain 15a and the trailing curtain 15b (see U2). At this point, exposure control (photometering operation and selection of an f-number and a shutter speed), various calculations for AF control and communications with the lens barrel 12 are performed; detailed descriptions thereof will be omitted herein.

Subsequently, the drive motor 22 is driven forward (see U3) to rotate the sun gear 31 counterclockwise with respect to FIG. 5 via the motor pinion 23 and the reduction gears 24, and 26. Although this rotational direction of the sun gear 31 is a rotational direction to bring the planetary gear arm 32 and the planet gear 33 close to the first cam-incorporated gear 35, the planet gear 33 is already engaged with the first cam-incorporated gear 35, and the planetary gear arm 32 is prevented from rotating in the same rotational direction by the engagement between the sub-arm 32a and the swing movement limit protrusion 13a. Therefore, the counterclockwise direction of the sun gear 31 causes the planet gear 33 to rotate clockwise with respect to FIG. 5 without changing the position of the axis thereof, thus causing the first cam-incorporated gear 35 to rotate counterclockwise with respect to FIG. 5. A predetermined amount of rotation of the first cam-incorporated gear 35 from the origin position causes one of the two non-constant-radius cam portions 40b of the mirror control cam 40 to come into contact with the cam follower 45b and press the cam follower 45b to rotate the mirror drive lever 45 toward the mirror-up position. Thereupon, the mirror sheet boss 14a is pushed up by the mirror-up spring 46, which causes the mirror 14 to rotate toward the upper retracted position from the down position (see U4). The predetermined amount of rotation of the first cam-incorporated gear 35 from the origin position causes the contact position of the code plate brush 37 with the code plate 39 to vary to thereby turn OFF the mirror down switch 63 (see U5). Additionally, during the counterclockwise rotation of the first cam-incorporated gear 35 from the origin position, the shutter charge lever 50 is rotated from the charge position toward the charge release position by the biasing force of the charge lever restoring spring 54 while the first cam follower 50f is guided by one of the two non-constant-radius cam portions 41b (so that the first shutter control cam 41 gradually reduces the amount of depression against the first cam follower 50f) (see U6). Following this rotation of the shutter charge lever 50, the shutter setting lever 51 is also rotated toward the shutter release position from the shutter holding position by the biasing force of the setting lever restoring spring 55.

Figure 6:
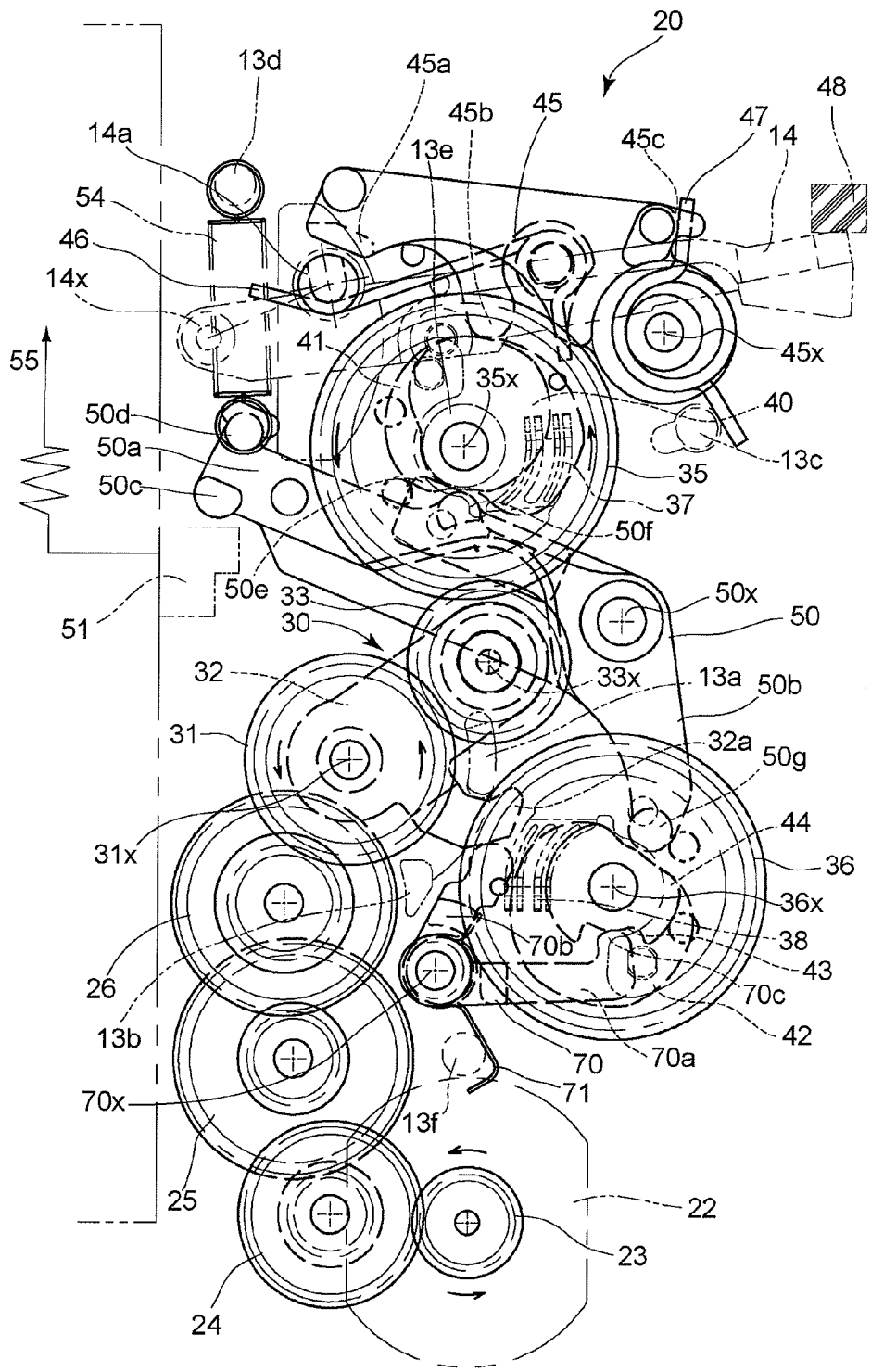
FIG. 6 is a side elevational view of the mirror/shutter drive mechanism in an exposure-possible state in which the mirror is held in the retracted position and a shutter charge lever is held in the charge release position.
Figure 7:
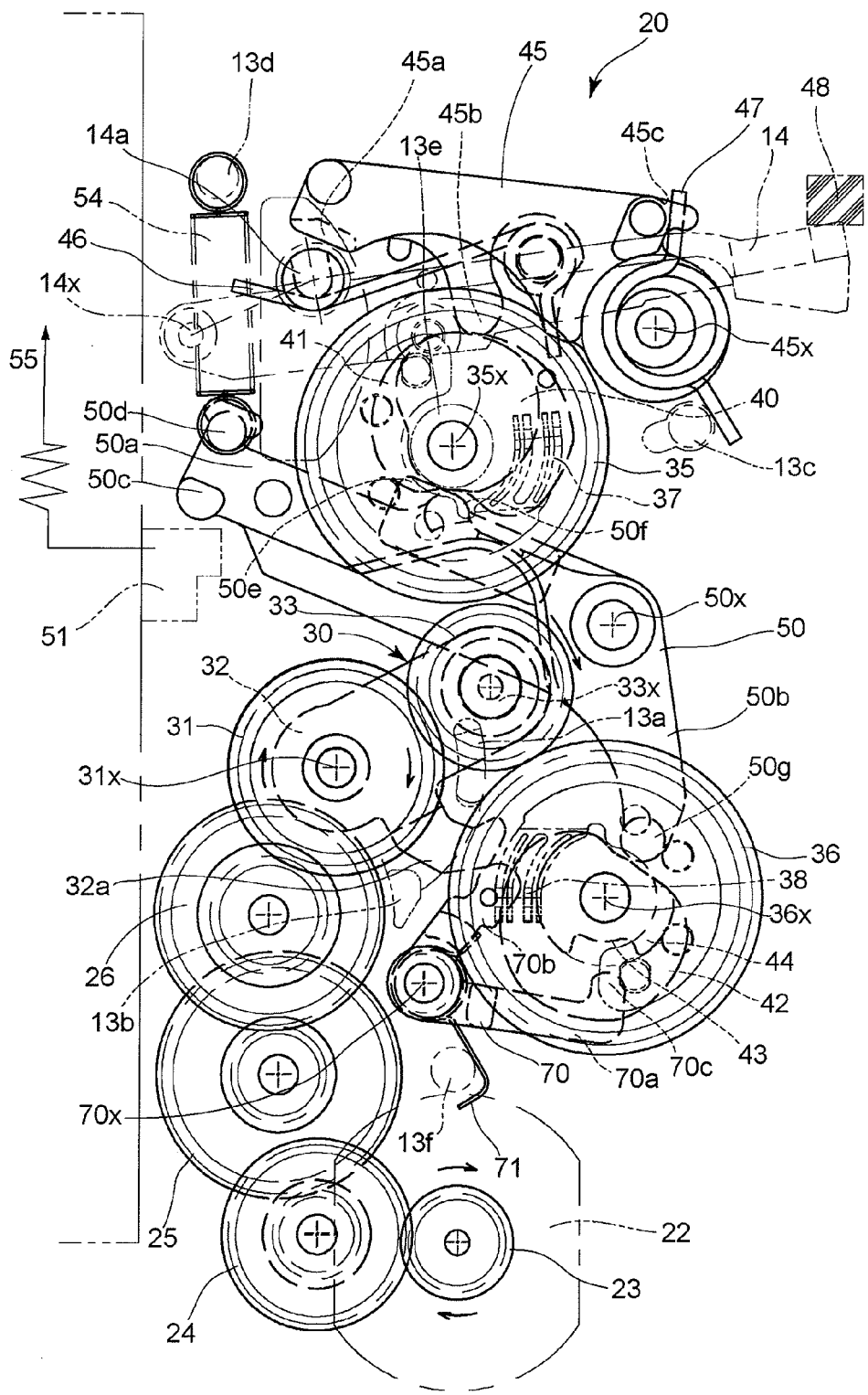
FIG. 7 is a side elevational view of the mirror/shutter drive mechanism in a state where the planetary gear arm of a planetary gear mechanism which bears a plane gear is in the process of swinging from a position where the plane gear is engaged with the first cam-incorporated gear to another position where the planet gear is engaged with the second cam-incorporated gear by a reverse driving of a motor from the exposure possible state shown in FIG. 6 during the photographing operation in the live view mode.
Figure 18:
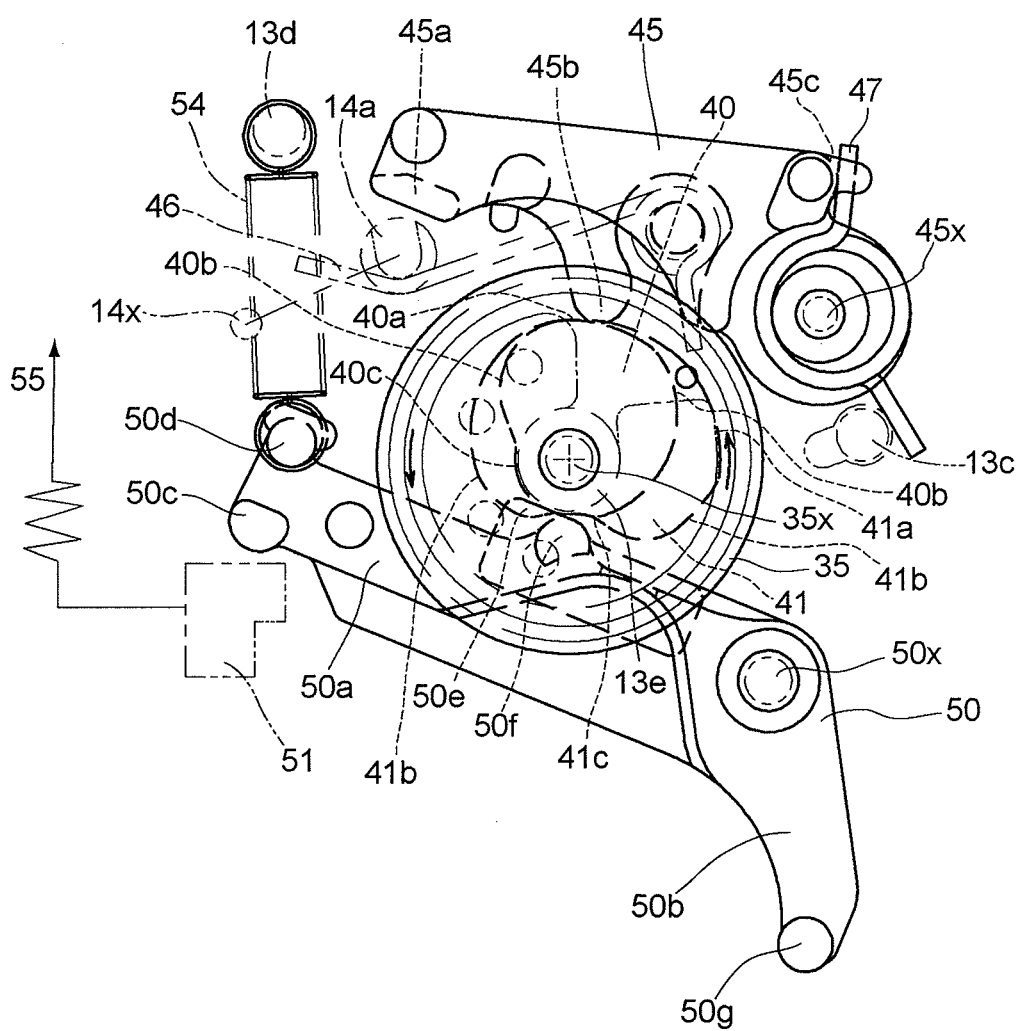
FIG. 18 is a side elevational view of the first cam-incorporated gear, the mirror drive lever, the shutter charge lever and associated elements, showing the relative positions between the first cam-incorporated gear, the mirror drive lever and the shutter charge lever when the first cam-incorporated gear is positioned at the origin position thereof shown in FIG. 6.

Upon the first cam-incorporated gear 35 being rotated to the mirror-up completion position shown in FIGS. 6 and 18, the mirror-up switch 64 is turned ON (see U7). Upon the ON signal being input to the control circuit 60 via the mirror-up switch 64, the forward rotation of the drive motor 22 is stopped (see U8). Thereupon, the mirror-up operation (upward rotations of the mirror 14 and the mirror drive lever 45) and the retracting operation (upward rotation) of the shutter charge lever 50 are stopped. More specifically, the mirror drive lever 45 is held in the mirror-up position by the engagement of the cam follower 45b with the constant-radius cam portion 40a against the biasing force of the mirror-down spring 47, thereby the mirror 14 being held in the upward retracted position (see U9). In addition, the first cam follower 50f of the shutter charge lever 50 is spaced from and faces the relief cam portion 41c of the first shutter control cam 41, and the shutter charge lever 50 is held in the charge release position by the stopper portion 50e being made to engage with the swing limit protrusion 13e by the biasing forces of the charge lever restoring spring 54 and the setting lever restoring spring 55 (see U10). At this time, the mirror/shutter drive mechanism 20 is in an exposure possible state shown in FIGS. 6 and 18. As can be seen from these drawings, the lock lever 70 has continued to be held in the locked position, in which the lock lug 70c is engaged in the lock recess 43, so that the state where the rotation of the second cam-incorporated gear 36 is restricted is still maintained.

Subsequently, after the drive motor 22 is stopped, the passage of current through the leading curtain holding magnet 52 is stopped (see U11), so that the leading curtain 15a of the shutter 15 the mechanical lock which has been already released travels (see U12). Subsequently, the lapse of time for opening-shutting the shutter 15 based on the set shutter speed is checked, the passage of current through the trailing curtain holding magnet 53 is stopped (see U13) upon a lapse of a predetermined period of time from the commencement of travel of the leading curtain 15a, and thereupon the trailing curtain 15b of the shutter 15 commences traveling (see U14). Due to such a difference in commencement of travel between the leading curtain 15a and the trailing curtain 15b, object light is incident on the light receiving surface of the image sensor 16, and thereby an exposure operation is performed.

Upon completion of this exposure operation, the drive motor 22 is driven forward (see U15), the restoring operation of the mirror 14 and the shutter charge operation are performed. First, the mirror-up switch 64 is turned OFF by a rotation of the first cam-incorporated gear 35 from the mirror-up completion position shown in FIGS. 6 and 18 (see U16). Additionally, the first cam follower 50f is guided by one of the two non-constant-radius cam portions 41b of the first shutter control cam 41 (while being depressed thereby) as the first cam-incorporated gear 35 rotates, which causes the shutter charge lever 50 to rotate toward the charge position from the charge release position against the biasing forces of the charge lever restoring spring 54 and the setting lever restoring spring 55 (see U17). This rotation of the shutter charge lever 50 causes the shutter setting lever 51 to be depressed, thus causing the leading curtain 15a and the trailing curtain 15b of the shutter 15 to be charged (see U18). In addition, as the first cam-incorporated gear 35 rotates, the cam follower 45b is guided by one of the two non-constant-radius cam portions 40b of the mirror control cam 40 (so that the mirror control cam 40 gradually reduces the amount of lifting of the cam follower 45b), so that the mirror drive lever 45 is rotated toward the mirror-down position from the mirror-up position by the biasing force of the mirror-down spring 47. Due to this rotation of the mirror drive lever 45, the mirror retaining portion 45a depresses the mirror sheet boss 14a, thus causing the mirror 14 to rotate toward the down position from the upward retracted position (see U19). At the time the first cam-incorporated gear 35 rotates by one revolution to return to the origin position, the rotation of the mirror 14 to the down position (the rotation of the mirror drive lever 45 to the mirror-down position) and the rotation of the shutter charge lever 50 to the charge position have been completed (see U20 and U21). Upon detection of a change in the ON/OFF state of the mirror-down switch 63 from an OFF state to an ON state immediately after the first cam-incorporated gear 35 reaches the origin position (see U22), the forward driving of the drive motor 22 is stopped (see U23), so that the mirror/shutter drive mechanism 20 returns to the initial position shown in FIGS. 5 and 17. Also during the time from the exposure possible state shown in FIGS. 6 and 18 to this initial position, the lock lever 70 continues to be held in the locked position by the biasing force of the lock lever biasing spring 71, so that the state where the rotation of the second cam-incorporated gear 36 is restricted by the lock lever 70 is maintained.

Namely, in a single photographing operation (sequence of processes for taking a picture) in the normal exposure mode, the first cam-incorporated gear 35 is rotated by one revolution and operations associated with the mirror 14 (the mirror drive lever 45) and the shutter 15 (the shutter charge lever 50) are controlled. In this photographing operation in the normal exposure mode, the rotation of the second cam-incorporated gear 36 is restricted by the lock lever 70 at all times.

Figure 15:
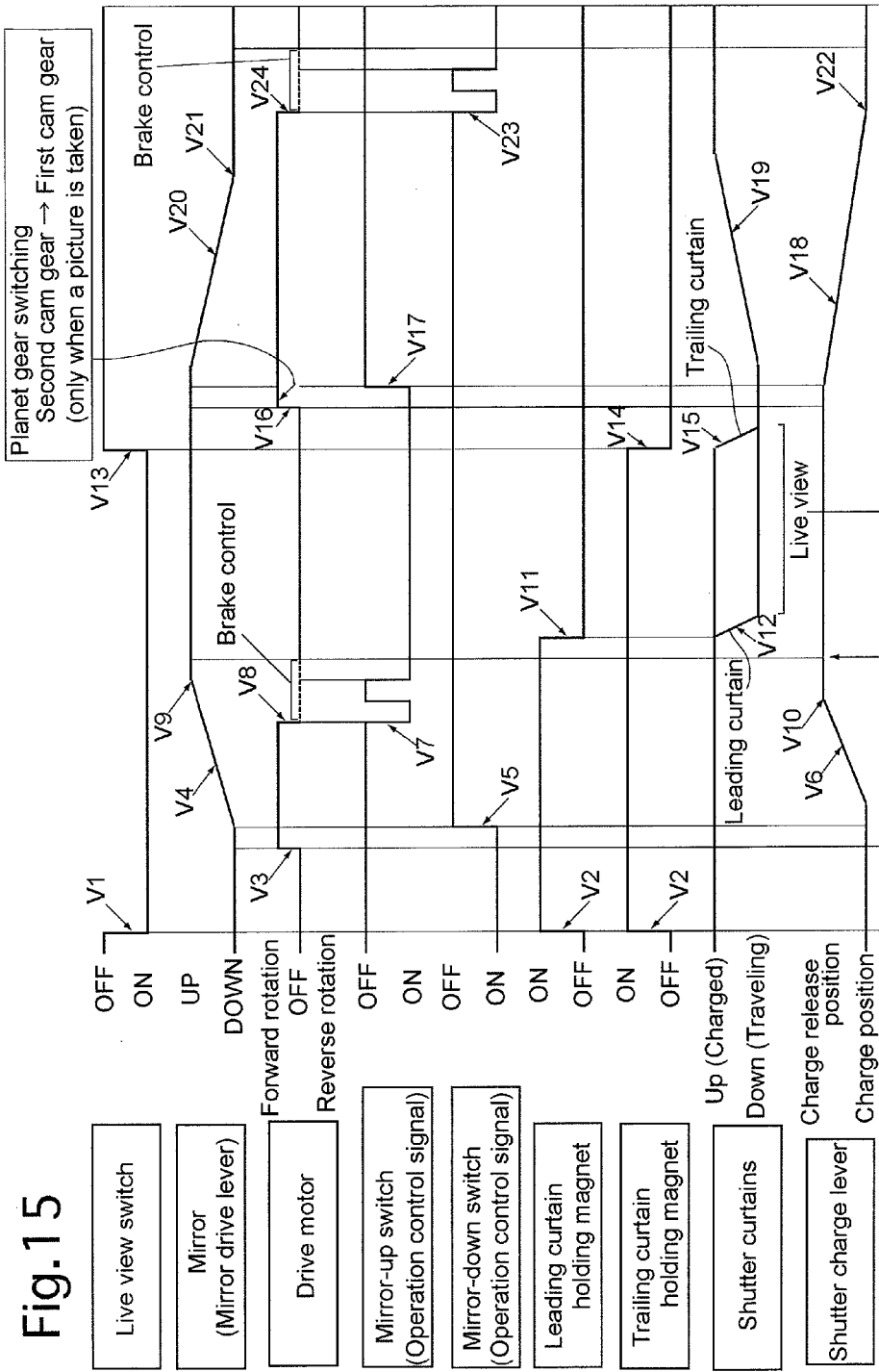
FIG. 15 is a timing chart showing a operational sequence of the live view mode.

In the initial state of the mirror/shutter drive mechanism 20 that is shown in FIGS. 5 and 17, upon the live view switch 62 being turned ON (see V1 shown in FIG. 15; refer to FIG. 15 when a numeral with the prefix "V" is found in the following descriptions), the camera 10 enters live view mode (live-view exposure mode) shown in the timing chart in FIG. 15. In the live view mode, the camera 10 operates in the same manner as in normal exposure mode until entering the exposure possible state shown in FIGS. 6 and 18. Namely, the controls and operations at V2 through V10 shown in FIG. 15 are identical to the above described controls and operations at U2 through U10 shown in FIG. 14; the forward driving of the drive motor 22 (see V3) causes the first cam-incorporated gear 35 to rotate from the origin position to the mirror-up completion position, and during this rotation of the first cam-incorporated gear 35 the mirror-up operation (see V4 and V9) and the retracting operation of the shutter charge lever 50 (see V6 and V10) are performed. Upon the first cam-incorporated gear 35 reaching the mirror-up completion position shown in FIGS. 6 and 18, the passage of current through the leading curtain holding magnet 52 is cut off (stopped) (see V11), which causes the leading curtain 15a of the shutter 15 to travel (V12). Subsequently, unlike in the case of normal exposure mode, the trailing curtain 15b does not travel following the leading curtain 15a, so that the shutter 15 is held open. Therefore, rays of light entering through the photographic lens 12a continue to be incident on the light receiving surface of the image sensor 16, and an electronic object image thus captured by the image sensor 16 is indicated in real-time on the LCD monitor 18 via image processing. On the other hand, since the mirror 14 is in the upward retracted position, the object image cannot be seen through the viewfinder 17. Similar to the case in the normal exposure mode, upon the live view switch 62 being turned ON, the lock lever 70 continues to be held in the locked position during the time the first cam-incorporated gear 35 moves from the origin position to the mirror-up completion position.

At this stage, turning off the live view switch 62 (see V13) de-energizes the trailing curtain holding magnet 53 (see V14) and thereupon the trailing curtain commences to travel (see V15). Subsequently, the drive motor 22 is driven forward (see V16), and thereafter, operations for making the mirror/shutter drive mechanism 20 return to the initial position that are similar to the above described controls and operations at U16 through U23 shown in FIG. 14 are performed (see V17 through V24). Namely, the first cam-incorporated gear 35 rotates from the mirror-up completion position shown in FIGS. 6 and 18 to the origin position shown in FIGS. 5 and 17, and during this rotation the mirror-down operation (see V20 and V21) and the shutter charge operation (V18, V19 and V22) are performed. Also during the time the first cam-incorporated gear 35 moves back to the origin position from the mirror-up completion position upon the live view switch 62 being turned OFF, the lock lever 70 continues to be held in the locked position.

Figure 16:
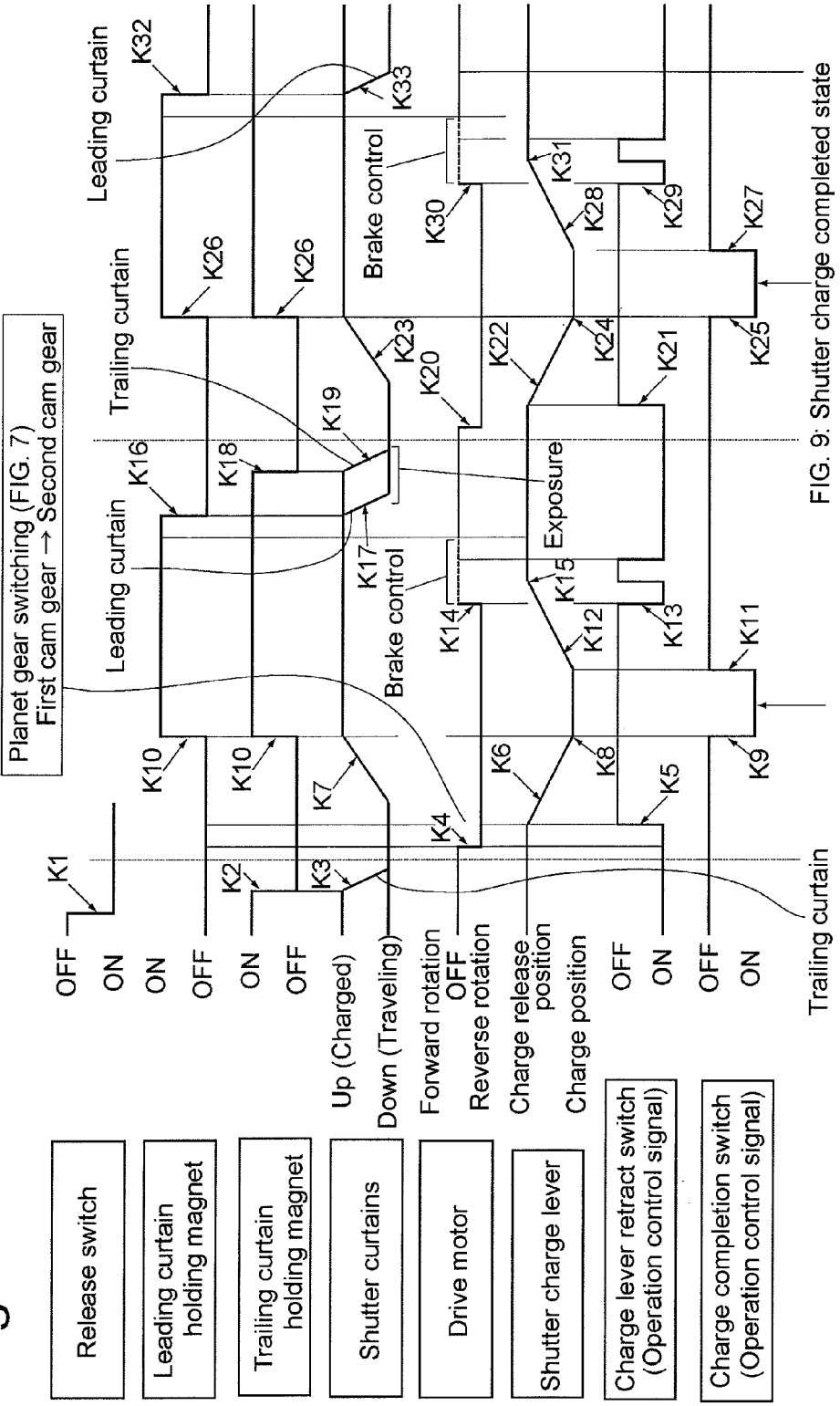
FIG. 16 is a timing chart showing a photographing operation in the live view mode.

On the other hand, in the live view mode (in this state the mirror/shutter drive mechanism 20 is in the state shown in FIGS. 6 and 18) after the traveling of the leading curtain 15a (V12) shown in FIG. 15, a photographing operation can be performed by turning ON the release switch 61. The timing chart shown in FIG. 16 shows this photographing operation in the live view mode. Upon the release switch 61 being turned ON (see K1 shown in FIG. 16; refer to FIG. 16 when a numeral with the prefix "K" is found in the following descriptions), firstly the passage of current through the trailing curtain holding magnet 53 is cut off (see K2), which causes the trailing curtain 15*b* to travel to temporarily shut the shutter 15. Thereupon, the shutter 15 is in an uncharged state, therefore the shutter 15 is recharged for the subsequent photographing operation. Although a shutter charge operation is performed by rotating the first cam-incorporated gear 35 by a forward rotation of the drive motor 22 in normal exposure mode shown in FIG. 14, the drive motor 22 is driven reverse (see K4) after completion of travel of the trailing curtain 15*b* when a picture is taken in the live view mode.

Figure 8:
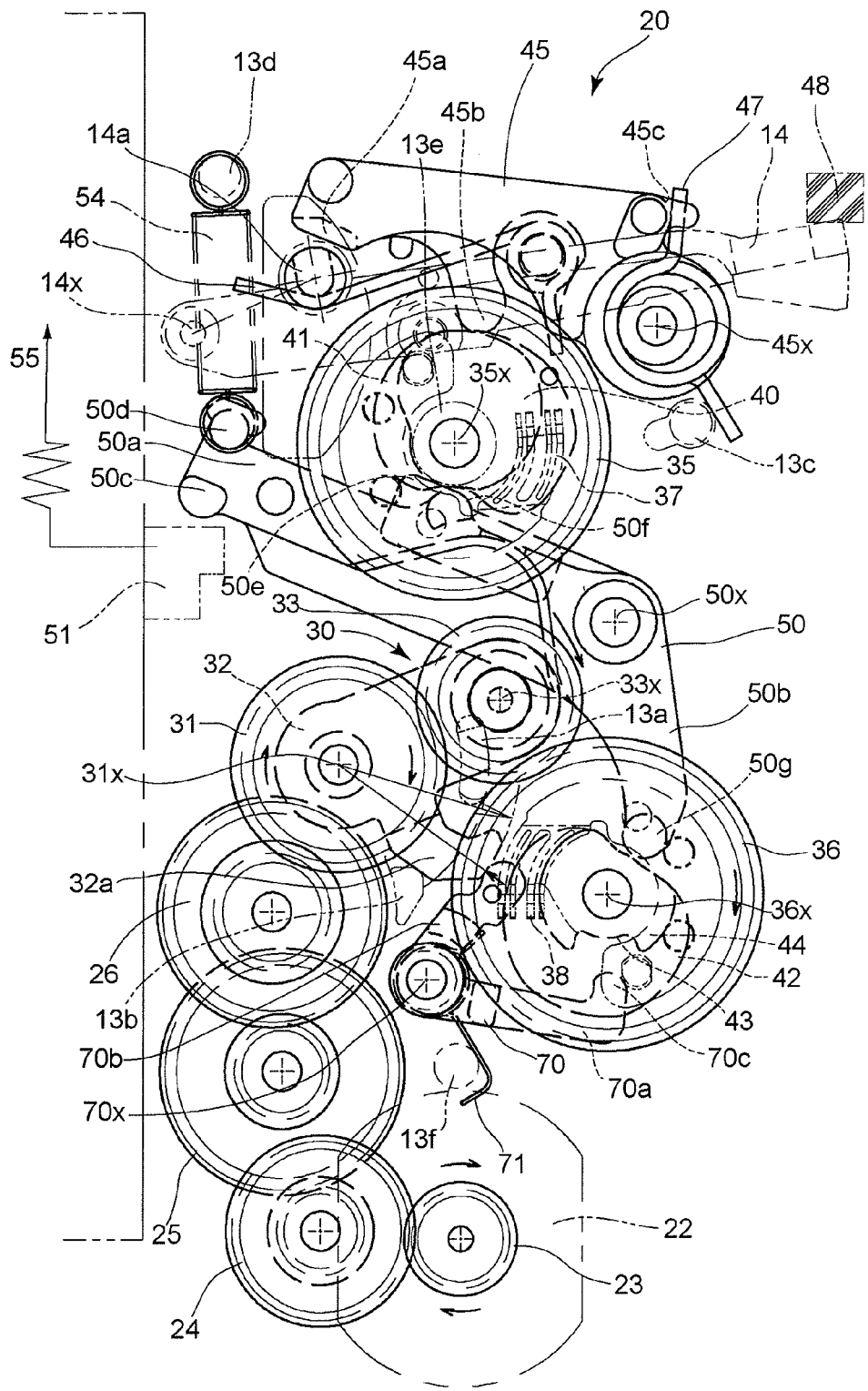
FIG. 8 is a side elevational view of the mirror/shutter drive mechanism in a state where the planet gear has reached the engaged position with the second cam-incorporated gear from the state shown in FIG. 7, so that the driving force of the motor is transmitted to the planet gear.
Figure 9:
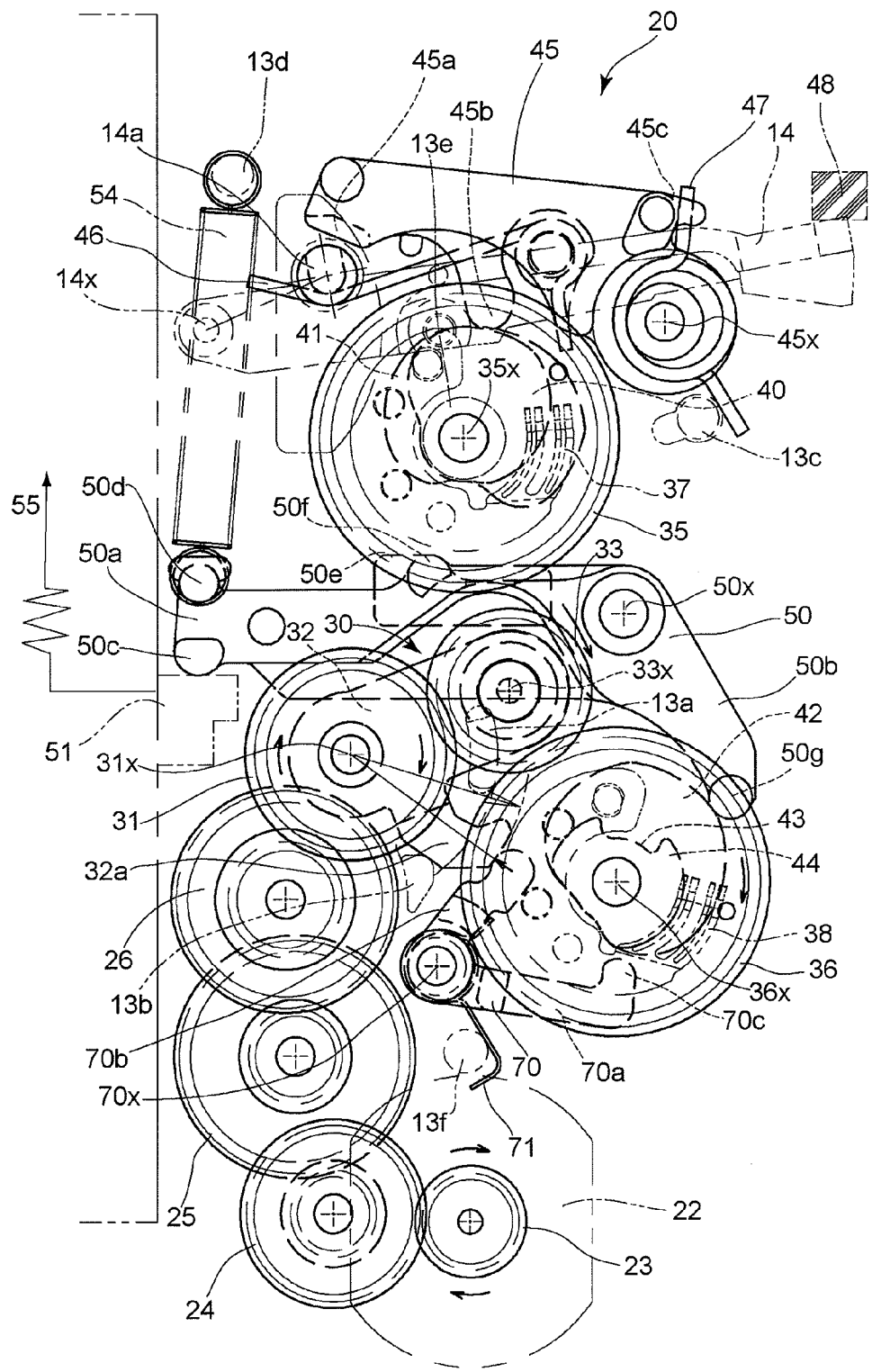
FIG. 9 is a side elevational view of the mirror/shutter drive mechanism in a state where the second cam-incorporated gear has been rotated from the state shown in FIG. 8 and a charge operation performed by the shutter charge lever has been completed.

The reverse driving of the drive motor 22 causes the sun gear 31 to rotate clockwise with respect to FIG. 6 via the motor pinion 23 and the reduction gears 24, 25 and 26. The planet gear 33 is pressed against the planetary gear arm 32 with a predetermined degree of friction by the biasing force of the planetary gear friction spring 34, and accordingly, this clockwise rotation of the sun gear 31 causes the planet gear 33 to revolve around the sun gear 31 while rotating the planetary gear arm 32 clockwise with respect to FIG. 6 about the rotational shaft 31*x*, thus causing the planet gear 33 to be disengaged from the first cam-incorporated gear 35 and be engaged with the second cam-incorporated gear 36. In other words, the planetary gear mechanism 30 changes to a transmission-ON state in which the driving force of the drive motor 22 can be transmitted to the second cam-incorporated gear 36. This engagement switching operation of the planet gear 33 causes the sub-arm 32*a* of the planetary gear arm 32 to press the driven arm 70*b*, thus causing the lock lever 70 to rotate from the locked position to the unlocked position (in the clockwise direction) against the biasing force of the lock lever biasing spring 71 to make the lock lug 71*c* disengaged from the lock recess 43. More specifically, in a state shown in FIG. 10 in which the planet gear 33 is engaged with the first cam-incorporated gear 35, the sub-arm 32*a* is slightly spaced from the driven arm 70*b*; however, from this state a rotation of the planetary gear arm 32 in a direction to approach the second cam-incorporated gear 36 causes the lock-lever-pressing beveled surface 32*e* of the sub-arm 32*a* to come in contact with the driven arm 70*b* and press the driven arm 70*b* to thereby rotate the lock lever 70 toward the unlocked position. Upon the lock lever 70 being rotated by a predetermined amount of rotation, the lock lug 70*c* is disengaged from the lock recess 43 to cancel the restriction of rotation of the second cam-incorporated gear 36 by the lock lever 70, thus allowing the second cam-incorporated gear 36 to rotate. Namely, the lock lever 70 moves to the unlocked position. In the state shown in FIGS. 7 and 11, the planet gear 33 is not yet engaged with the second cam-incorporated gear 36, and the structure (shape) of each of the sub-arm 32*a* and the driven arm 70*b* is determined so that the timing of disengagement of the lock lever 70 from the second cam-incorporated gear 36 occurs before the planet gear 33 is engaged with the second cam-incorporated gear 36. Subsequently, upon the planetary gear arm 32 further rotating toward the second cam-incorporated gear 36 to the swing limit where the swing movement limit surface 32*c* of the sub-arm 32*a* comes in contact with the swing limit protrusion 13*b* of the mirror box 13, the planet gear 33 engages with the second cam-incorporated gear 36 while the unlocked-state holding surface 32*d* of the sub-arm 32*a* engages with the unlocked-state holding surface 70*d* as shown in FIGS. 8 and 12. At this time, the unlocked-state holding surfaces 32*d* and 70*d* are orientated at positions to abut against each other to thereby prevent the lock lever 70 from rotating toward the locked position (i.e., in the counterclockwise direction), so that the lock lever 70 is held in the unlocked position by the engagement between the unlocked-state holding surfaces 32*d* and 70*d*.

Figure 19:
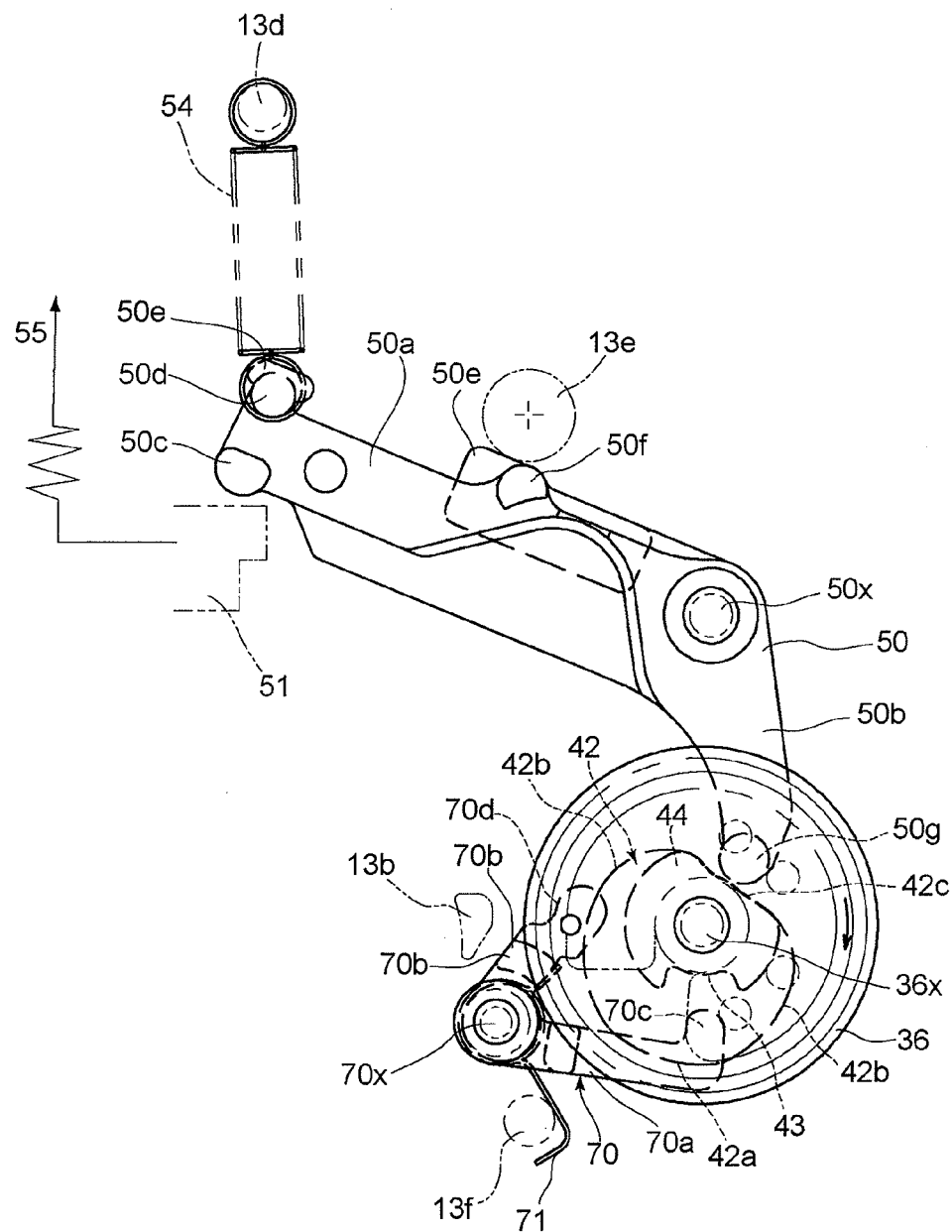
FIG. 19 is a side elevational view of the second cam-incorporated gear, the shutter charge lever, lock lever and associated elements, showing the relative position between the second cam-incorporated gear, the shutter charge lever and the lock lever when the second cam-incorporated gear is positioned at the origin position thereof shown in FIG. 8.
Figure 20:
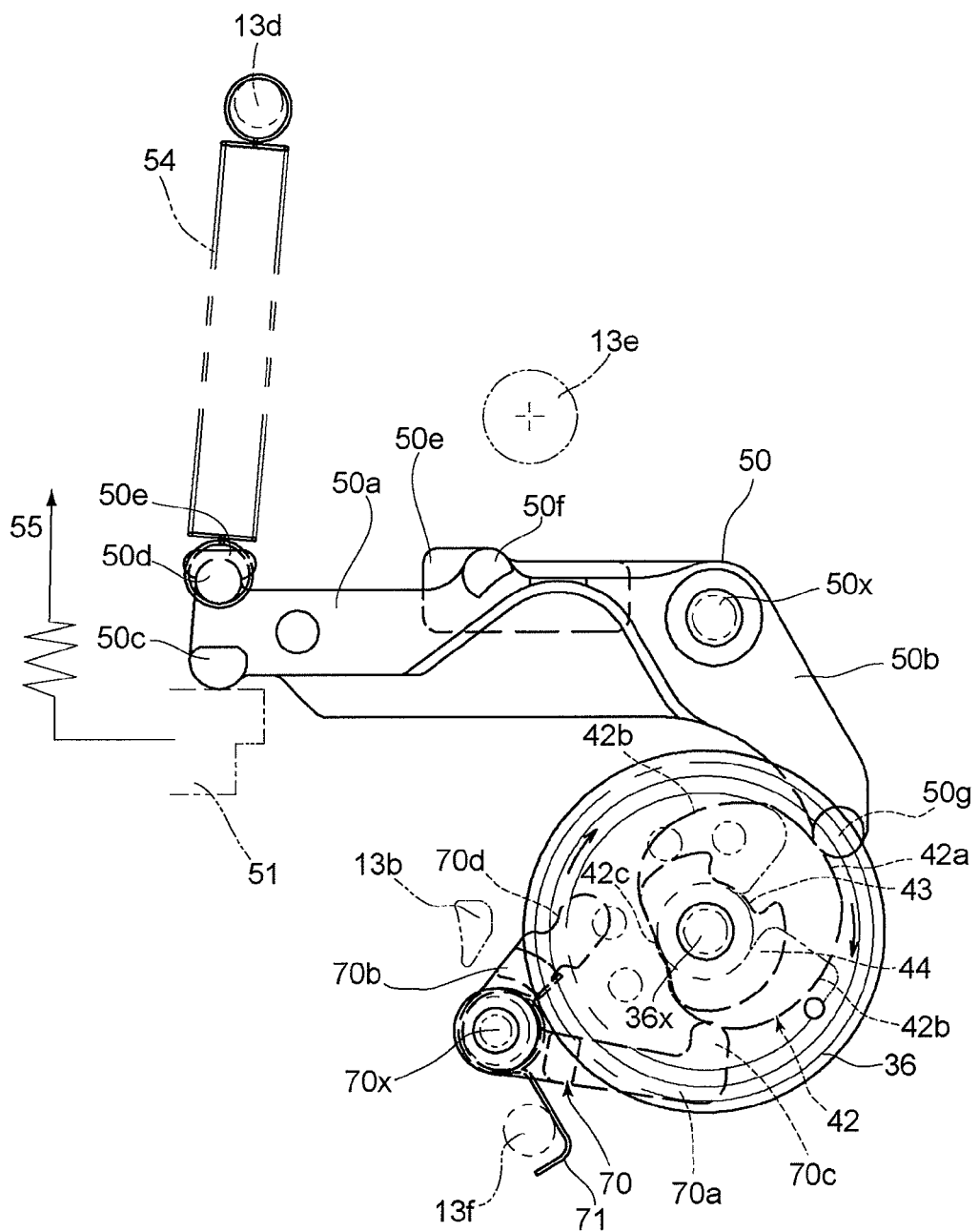
FIG. 20 is a side elevational view of the second cam-incorporated gear, the shutter charge lever, a lock lever and associated elements, showing the relative position between the second cam-incorporated gear, the shutter charge lever and the lock lever when the second cam-incorporated gear is positioned at the shutter charge completion position shown in FIG. 9.

FIGS. 8 and 19 show a state immediately after the planet gear 33 is engaged with the second cam-incorporated gear 36. Even in the state shown in FIGS. 8 and 19, the second cam-incorporated gear 36 still remains at the origin position because no motor driving force is transmitted to the second cam-incorporated gear 36 and the rotation of the second cam-incorporated gear 36 is restricted by the lock lever 70 during the time from the initial state shown in FIGS. 5 and 17 to the exposure possible state shown in FIGS. 6 and 18. Upon the planet gear 33 engaging with the second cam-incorporated gear 36 as shown in FIGS. 8 and 19, the second cam-incorporated gear 36, in a state of being released from the restriction of rotation thereof by the lock lever 70, there onwards rotates clockwise from the origin position shown in FIGS. 8 and 19 by receiving a reverse driving force from the drive motor 22.

When taking a picture in the live view mode, the driving operation of the drive motor 22 is controlled by the charge completion switch 65 and the charge lever retract switch 66 that are turned ON and OFF according to the rotational position (relative position between the code plate brush 38 and the code plate 39) of the second cam-incorporated gear 36. When the second cam-incorporated gear 36 is at the origin position as shown in FIGS. 8 and 19, the charge lever retract switch 66 is ON due to contact engagement between the code plate brush 38 and the cod plate 39; however, a rotation of the second cam-incorporated gear 36 from the origin position changes the relative contact position between the code plate brush 38 and the code plate 39 to thereby turn OFF the charge lever retract switch 66 (see K5). When the second cam-incorporated gear 36 is at the origin position, the second cam follower 50*g* of the shutter charge lever 50 faces the relief cam portion 42*c* of the second shutter control cam 42 with a slight distance therebetween, and the shutter charge lever 50 is held in the charge release position by the stopper portion 50*e* being made to engage with the swing limit protrusion 13*e*. Subsequently, a predetermined amount of rotation of the second cam-incorporated gear 36 from the origin position causes one of the two non-constant-radius cam portions 42*b* of the second shutter control cam 42 to come into contact with the second cam follower 50*g* and lift the second cam follower 50*g* to rotate the shutter charge lever 50 from the charge release position toward the charge position against the biasing force of the charge lever restoring spring 54 (see K6). This rotation of the shutter charge lever 50 causes the shutter setting lever 51 to rotate from the shutter release position toward the shutter holding position against the biasing force of the setting lever restoring spring 55 so that a shutter charge operation for the leading curtain 15*a* and the trailing curtain 15*b* is performed (see K7). Upon the second cam-incorporated gear 36 reaching the shutter charge completion position shown in FIGS. 9 and 20, the shutter charge lever 50 is positioned in the shutter charge position by the engagement of the second cam follower 50*g* with the constant-radius cam portion 42*a* of the second shutter control cam 42, and the shutter charge operation is completed (see K8). Thereupon, the charge completion switch 65 is turned ON (see K9). In response to this signal input from the charge completion switch 65, the leading curtain holding magnet 52 and the trailing-curtain holding magnet 53 are energized to hold the leading curtain 15*a* and the trailing curtain 15*b* magnetically (see K10). During the time the second cam-incorporated gear 36 moves from the origin position to the shutter charge completion position, the lock lever 70 continues to be held in the unlocked position by the planetary gear arm 32, so that the rotation of the second cam-incorporated gear 36 is not restricted.

Even after the completion of this shutter charge operation, the drive motor 22 continues to be driven reverse to rotate the second cam-incorporated gear 36, which causes the charge completion switch 65 to be turned OFF (see K11). Subsequently, the second cam follower 50g is guided by the other of the two non-constant-radius cam portions 42b of the second shutter control cam 42 (so that the lifted state of the second cam follower 50g by the second shutter control cam 42 is gradually released), so that the shutter charge lever 50 is rotated from the charge position shown in FIGS. 9 and 20 toward the charge release position shown in FIGS. 8 and 19 by the biasing force of the charge lever restoring spring 54 (see K12). After a short period of time, the charge lever retract switch 66 is turned ON (see K13), and in response to this ON signal from the charge lever retract switch 66, the reverse driving of the drive motor 22 is stopped (see K14). At this time, the second cam-incorporated gear 36 has already returned to the origin position shown in FIGS. 8 and 19, and the shutter charge lever 50 is held in the charge release position by the biasing force of the charge lever restoring spring 54 (see K15). In addition, following the shutter charge lever 50, the shutter setting lever 51 is also held in the shutter release position by the biasing force of the setting lever restoring spring 55. Thereafter, also during the time the second cam-incorporated gear 36 moves back to the origin position from the shutter charge completion position, the lock lever 70 continues to be held in the unlocked position by the planetary gear arm 32, so that the rotation of the second cam-incorporated gear 36 is not restricted.

Subsequently, similar to the normal exposure mode, the passage of current through the leading curtain holding magnet 52 is stopped (see K16), and thereupon the leading curtain 15a of the shutter 15 travels (see K17). Subsequently, upon a lapse of a predetermined period of time corresponding to the set shutter speed, the passage of current through the trailing curtain holding magnet 53 is stopped (see K18), and thereupon the trailing curtain 15b travels (see K19) to perform an exposure operation. After completion of this exposure operation, the shutter 15 is shut, and accordingly, the second cam-incorporated gear 36 is rotated one more revolution from the origin position to open the shutter 15 so that the camera 10 moves back to a live view state, in which an electronic object image captured by the image sensor 16 is indicated in real-time on the LCD monitor 18. Controls and operations performed through the above-mentioned one more revolution of the second cam-incorporated gear 36 are similar to the above described controls and operations at K4 through K15, and therefore will be briefly discussed hereinafter. First, after the traveling of the trailing curtain 15b, the drive motor 22 is driven in reverse to make the second cam-incorporated gear 36 commence rotating (see K20), and thereafter the charge lever retract switch 66 is turned OFF (see K21). Following the rotation of the second cam-incorporated gear 36, the second shutter control cam 42 again comes into contact with the second cam follower 50g and lifts the second cam follower 50g by one of the two non-constant-radius cam portions 42b, which causes the shutter charge lever 50 to rotate from the charge release position toward the charge position (see K22), so that the shutter 15 is charged (see K23). After a short period of time, upon the second cam-incorporated gear 36 reaching the shutter charge completion position shown in FIGS. 9 and 20, the shutter charge lever 50 is held in the charge position by the engagement of the second cam follower 50g with the constant-radius cam portion 42a of the second shutter control cam 42 (see K24), the charge completion switch 65 is turned ON (see K25), and in response to this ON signal from the charge completion switch 65 the leading curtain holding magnet 52 and the trailing curtain holding magnet 53 are energized to hold the leading curtain 15a and the trailing curtain 15b, respectively (see K26). Subsequently, the reverse driving of the drive motor 22 continues, the charge completion switch 65 is turned OFF (see K27), and the pressed state of the second cam follower 50g by the second shutter control cam 42 is gradually released (i.e., the second cam follower 50g being guided by the other of the two non-constant-radius cam portions 42b), which causes the shutter charge lever 50 to rotate to the charge release position again by the biasing force of the charge lever restoring spring 54 (see K28). In a short period of time thereafter, it is detected that the charge lever retract switch 66 is turned ON (see K29), and thereupon the reverse driving of the drive motor 22 is stopped (see K30), and the shutter charge lever 50 is held in the charge release position (see K31). At this stage, the passage of current through the leading curtain holding magnet 52 is cut off (see K32) so that the leading curtain 15a travels (see K33) and the trailing curtain 15b is held so that it does not travel, thereby moving the camera 10 into the same live view state as that after the traveling of the leading curtain 15a at the operation V12 shown in FIG. 15. Also during the time the drive motor 22 is driven reverse from K20 to K30 shown in FIG. 16, the lock lever 70 continues to be held in the unlocked position by the planetary gear arm 32, so that the rotation of the second cam-incorporated gear 36 is not restricted.

When a picture is taken in the live view mode shown in FIG. 16, the planet gear 33 is in mesh with the second cam-incorporated gear 36 while the first cam-incorporated gear 35 remains in the mirror-up completion position shown in FIGS. 6 through 9 and 18, so that the mirror 14 remains held in the upper retracted position. Namely, when a picture is taken in the live view mode, the mirror 14 does not perform an up/down operation at all.

In live view state after the travel of the leading curtain at K33, upon the live view switch 62 is turned OFF to end the live view mode, operations similar to the above described operations at V13 through V22 shown in FIG. 15 are performed and the mirror-shutter drive mechanism 20 returns to the initial state shown in FIGS. 5 and 17. However, after the completion of the photographing operation in the live view mode shown in FIG. 16, the planet gear 33 is engaged with the second cam-incorporated gear 36, not with the first cam-incorporated gear 35, which is different from the case where control exits the live view mode without making the mirror-shutter drive mechanism 20 perform a photographing operation (more specifically, control exits the live view mode by performing only the processes shown in FIG. 15, i.e., without entering the photographing operation shown in FIG. 16). Therefore, in the case where control carries out the photographing operation in the live view mode shown in FIG. 16, a gear switching operation is carried out in which the planet gear 33 is disengaged from the second cam-incorporated gear 36 to be re-engaged with the first cam-incorporated gear 35 when the drive motor 22 is driven forward at V16 shown in FIG. 15. In this engagement switching operation, the driven arm 70b is released from the pressure by the sub-arm 32a of the planetary gear arm 32, which causes the lock lever 70 to rotate from the unlocked position to the locked position by the biasing force of the lock lever biasing spring 71. As a result, the lock lug 70c is engaged in the lock recess 43 to thereby restrict the rotation of the second cam-incorporated gear 36. Subsequently, the mirror/shutter drive mechanism 20 returns to the state shown in FIG. 6 from the state shown in FIG. 8, and thereafter, the above described finalization process in the live view mode is performed (see V17 through V22).

As described above, in the present embodiment of the mirror/shutter drive mechanism 20, by transmitting a motor driving force selectively to the first cam-incorporated gear 35 and the second cam-incorporated gear 36 via the planetary gear mechanism 30 in accordance with forward and rearward rotations of the drive motor 22, a shutter charge operation can be performed with no up/down operation of the mirror 14 in a photographing operation during the live view mode. Additionally, during the time a motor driving force is transmitted to the first cam-incorporated gear 35 via the planetary gear mechanism 30, the second cam-incorporated gear 36 can be reliably held at the origin position by restricting the rotation of the second cam-incorporated gear 36 by the lock lever 70, and accordingly, there is no possibility of a malfunction of the second cam-incorporated gear 36 relative to the shutter charge mechanism (shutter charge lever 50) occurring. For instance, if there is a displacement in rotational position of the second cam-incorporated gear 36 during a normal photographing operation, in which the actuation of the shutter charge lever 50 is to be controlled by the first cam-incorporated gear 35, the retracting operation of the shutter charge lever 50 is not normally performed (more specifically, the retracting operation of the shutter charge lever 50 stops in the middle by engagement of the second cam follower 50g with the second shutter control cam 42), so that there is a possibility of the leading and trailing curtains 15a and 15b becoming incapable of traveling properly. However, according to the structure of the present embodiment of the power transmission mechanism, a displacement of the second cam-incorporated gear 36 that may cause the second cam-incorporated gear 36 to malfunction can be securely prevented from occurring by the lock lever 70. In addition, also in the photographing operation in the live view mode, in which the second cam-incorporated gear 36 is used for control of the actuation of the shutter charge lever 50, a high-precision driving of the second cam-incorporated gear 36 is achieved because it is ensured that the second cam-incorporated gear 36 is properly positioned at the origin position when the planet gear 33 is disengaged from the first cam-incorporated gear 35 to come into engagement with the second cam-incorporated gear 36.

In addition, since the lock lever 70 is moved between the locked position and the unlocked position in accordance with the force of the swing movement of the planetary gear arm 32 that serves as an element of the planetary gear mechanism 30, no independent drive source for driving the lock lever 70 is required, which contributes to an achievement of a reduction in number of elements, thus simplifying the structure of the power transmission mechanism and achieving a reduction in the production cost thereof.

The reason why the lock lever 70 is installed only on the second cam-incorporated gear 36 out of the two cam-incorporated gears 35 and 36 will be discussed hereinafter. As can be understood from the above descriptions, the rotational position of the second cam-incorporated gear 36 at which the rotation thereof is restricted designates the origin position thereof, and at this origin position the relief cam portion 42c of the second shutter control cam 42 receives no pressure from the second cam follower 50g, so that no holding force by the shutter charge lever 50 acts on the second cam-incorporated gear 36. Hence, restricting the rotation of the second cam-incorporated gear 36 by the lock lever 70 is effective. On the other hand, as for the first cam-incorporated gear 35, the first cam follower 50f of the shutter charge lever 50 presses the constant-radius cam portion 41a of the first shutter control cam 41 when the first cam-incorporated gear 35 is positioned at the origin position, and the cam follower 45b of the mirror drive lever 45 presses the constant-radius cam portion 40a of the mirror control cam 40 when the first cam-incorporated gear 35 is positioned in the mirror-up completion position; accordingly, in either state, the holding force by the mirror drive lever 45 or the shutter charge lever 50 acts on the first cam-incorporated gear 35. Accordingly, there is no possibility of the rotational position of the first cam-incorporated gear 35 deviating even in a state where the planet gear 33 is disengaged from the first cam-incorporated gear 35, and hence, the mirror/shutter drive mechanism 20 is provided with no rotation restrictor such as the lock lever 70 for the first cam-incorporated gear 35.

Although the present invention has been described based on the above illustrated embodiment of the power transmission mechanism, the present invention is not limited solely to this particular embodiment. For instance, although the mirror/shutter drive mechanism 20 is provided with no rotation restrictor for the first cam-incorporated gear 35 due to the above described reason, the mirror/shutter drive mechanism 20 can be provided with a rotation restrictor similar to the lock lever 70 for the first cam-incorporated gear 35 to impose a more reliable rotation restriction thereon.

Although a drive switcher between the first cam-incorporated gear 35 and the second cam-incorporated gear 36 is configured from the planetary gear mechanism 30 while the lock lever 70 moves between the locked position and the unlocked position by swing movement of the planetary gear arm 32 of the planetary gear mechanism 30 in the above described embodiment of the power transmission mechanism, the present invention can also be applied to another type of power transmission mechanism which is equipped with a drive switcher other than a planetary gear mechanism such as the planetary gear mechanism 30. For instance, it is possible to adopt a drive switcher configured of a slide gear mechanism provided with two gears (rotational drive members) and a slide gear, wherein the two gears are arranged at different positions in the axial direction of the rotational axes thereof, while the slide gear is slidable in this axial direction to be selectively engaged with the two gears. In this case, a rotation restrictor (which corresponds to the lock lever 70 of the above described embodiment) can be structured so as to be switched between a locked position and a unlocked position with respect to the associated gear (which corresponds to the second cam-incorporated gear 36 of the above described embodiment) in association with the engagement switching operation (movement in the direction of the rotational axis) of the slide gear.

In addition, although the lock lug 70c is formed on the lock lever 70 while the lock recess 43 is formed on the second cam-incorporated gear 36 in the above illustrated embodiment of the power transmission mechanism, the engagement relationship therebetween can be reversed so that the lock lever 70 can be provided with a recess and the lock piece 44 can be provided with a lug.

Additionally, although the present invention has been applied to the above described embodiment of the power transmission mechanism that serves as a power transmission mechanism for constructing live view mode in an SLR digital camera, the present invention can also be applied to another type of power transmission mechanism.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A power transmission mechanism comprising:
a rotational drive member which rotates to drive a driven member;
a drive switcher for switching between a transmission-ON state in which a driving force of a drive source is transmitted to said rotational drive member to rotate said rotational drive member, and a transmission-OFF state in which said transmission of said driving force to said rotational drive member is canceled; and
a rotation restrictor which allows said rotational drive member to rotate when said drive switcher is in said transmission-ON state, and is engaged with said rotational drive member to restrict rotation of said rotational drive member when said drive switcher is in said transmission-OFF state.

2. The power transmission mechanism according to claim 1, wherein said rotation restrictor switches between a state to allow said rotational drive member to rotate and a state to restrict said rotation of said rotational drive member via use of a switching force of said drive switcher which is produced when said drive switcher moves between said transmission-ON state and said transmission-OFF state.

3. The power transmission mechanism according to claim 1, wherein said rotational drive member comprises a gear,
wherein said drive switcher comprises:
a planet gear swingable between an engaged position to be engaged with said gear of said rotational drive member and a disengaged position to be disengaged from said gear of said rotational drive member; and
a swingable arm which supports said planet gear,
wherein said rotation restrictor includes a lock lever that is swingable between a rotation restrictive position, in which said lock lever is engaged with said rotational drive member, and a rotation permitting position, in which said lock lever is disengaged from said rotational drive member, and
wherein said lock lever is held in said rotation restrictive position by a biaser when said planet gear is in said disengaged position and held in said rotation permitting position by said swingable arm against a biasing force of said biaser when said planet gear is in said engaged position.

4. The power transmission mechanism according to claim 3, wherein said rotational drive member comprises a cam-incorporated gear having a surface cam, said gear being formed on a periphery of said cam-incorporated gear,
wherein said driven member comprises a swingable member having a follower contactable with said surface cam, a rotation of said cam-incorporated gear causing said swingable member to rotate in accordance with a cam profile of said surface cam,
wherein said power transmission mechanism further comprises a swing movement limiter which holds said swingable member at a specific rotational position of said cam-incorporated gear independently of said surface cam, and
wherein said lock lever is positioned at said rotation restrictive position and restricts said rotation of said cam-incorporated gear when said cam-incorporated gear is positioned at said specific rotational position, in which said swing movement limiter holds said swingable member.

5. The power transmission mechanism according to claim 4, wherein said cam-incorporated gear comprises a lock recess formed at a position different from a position of said surface cam in a direction of a rotational axis of said cam-incorporated gear, and
wherein said lock lever includes a lock lug which can be engaged in and disengaged from said lock recess.

6. The power transmission mechanism according to claim 4, further comprising another cam-incorporated gear, said planet gear being selectively engaged with said cam-incorporated gear and said another cam-incorporated gear,
wherein said another cam-incorporated gear is driven to rotate via said planet gear to control swing movements of said swingable member and another swingable member, and
wherein a holding force by one of said swingable member and said another swingable member acts on said another cam-incorporated gear when said planet gear is engaged with said cam-incorporated gear.

7. The power transmission mechanism according to claim 6, wherein said power transmission mechanism is incorporated in an imaging apparatus, said imaging apparatus comprising:
a mirror movable between a viewing position, in which said mirror reflects incident light from an imaging optical system toward a viewfinder optical system, and a retracted position, in which said mirror is retracted so that light which is passed through said imaging optical system is incident on an image pickup medium without being reflected by said mirror; and
a shutter which prevents said light that is passed through said imaging optical system from being incident on said image pickup medium when shut, and allows said light that is passed through said imaging optical system to be incident on said image pickup medium when opened,
wherein said swingable member includes a shutter charge lever that is swingable between a charge release position to allow said shutter to travel and a charge position to carry out a shutter charge operation of said shutter after completion of traveling of said shutter, and
wherein said another swingable member includes a mirror drive lever that is swingable between a mirror-down position to hold said mirror in said viewing position and a mirror-up position to hold said mirror in said retracted position.

8. The power transmission mechanism according to claim 1, wherein said drive switcher comprises a planetary gear mechanism including a sun gear and a planet gear that is engaged with and revolves around said sun gear.

9. The power transmission mechanism according to claim 4, wherein said rotation restrictor comprises a swingable member that is swingable about an axis parallel to an axis of rotation of said cam-incorporated gear.

10. An imaging apparatus, comprising:
a mirror movable between a viewing position, in which said mirror reflects incident light from an imaging optical system toward a viewfinder optical system, and a retracted position, in which said mirror is retracted so that light which is passed through said imaging optical system is incident on an image pickup medium without being reflected by said mirror;
a shutter which prevents said light that is passed through said imaging optical system from being incident on said image pickup medium when shut, and allows said light that is passed through said imaging optical system to be incident on said image pickup medium when opened;

a mirror drive lever, swingable between a mirror-down position to hold said mirror in said viewing position and a mirror-up position to hold said mirror in said retracted position;

a shutter charge lever, swingable between a charge release position to allow said shutter to travel and a charge position to carry out a shutter charge operation of said shutter after completion of traveling of said shutter;

a mirror/shutter control cam-incorporated gear which controls swing movements of said mirror drive lever and said shutter charge lever via rotation of said mirror/shutter control cam-incorporated gear;

a shutter control cam-incorporated gear which controls said swing movement of said shutter charge lever via rotation of said shutter control cam-incorporated gear;

a planetary gear mechanism including a planet gear that selectively engages with said mirror/shutter control cam-incorporated gear and said shutter control cam-incorporated gear, wherein a rotational driving force of a drive source is transmitted to said mirror/shutter control cam-incorporated gear when said planet gear is engaged with said mirror/shutter control cam-incorporated gear, and wherein the rotational driving force of said drive source is transmitted to said shutter control cam-incorporated gear when said planet gear is engaged with said shutter control cam-incorporated gear; and a rotation restrictor which is engageable with at least one of said mirror/shutter control cam-incorporated gear and said shutter control cam-incorporated gear to restrict rotation of one of said mirror/shutter control cam-incorporated gear and said shutter control cam-incorporated gear when said planet gear is engaged with the other of said mirror/shutter control cam-incorporated gear and said shutter control cam-incorporated gear.

11. The imaging apparatus according to claim 10, wherein said shutter control cam-incorporated gear comprises a lock recess which is recessed radially inwards in a direction approaching a rotational axis of said shutter control cam-incorporated gear, and wherein said rotation restrictor restricts rotation of said shutter control cam-incorporated gear via engagement with said lock recess when said planet gear is engaged with said mirror/shutter control cam-incorporated gear.

* * * * *